(12) United States Patent
Hendry et al.

(10) Patent No.: US 9,930,378 B2
(45) Date of Patent: Mar. 27, 2018

(54) SIGNALING OF OPERATION POINTS FOR CARRIAGE OF HEVC EXTENSIONS

(71) Applicant: QUALCOMM Incorporated, San Diego, CA (US)

(72) Inventors: Fnu Hendry, San Diego, CA (US); Ying Chen, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 15/040,418

(22) Filed: Feb. 10, 2016

(65) Prior Publication Data

US 2016/0234518 A1    Aug. 11, 2016

Related U.S. Application Data

(60) Provisional application No. 62/115,089, filed on Feb. 11, 2015.

(51) Int. Cl.
*H04N 7/12* (2006.01)
*H04N 21/2343* (2011.01)

(52) U.S. Cl.
CPC .......................... *H04N 21/234327* (2013.01)

(58) Field of Classification Search
CPC .............................................. H04N 21/234327
See application file for complete search history.

(56) References Cited

U.S. PATENT DOCUMENTS

| 7,281,018 | B1 * | 10/2007 | Begun .................. G06F 17/218 |
| 9,635,381 | B2 * | 4/2017 | Nakamura ............. H04N 19/52 |
| 2011/0032999 | A1 | 2/2011 | Chen et al. |
| 2014/0086333 | A1 | 3/2014 | Wang |
| 2014/0140400 | A1 * | 5/2014 | George ................. H04N 19/52 |
| | | | 375/240.12 |
| 2015/0264348 | A1 * | 9/2015 | Zou ....................... H04N 19/70 |
| | | | 375/240.02 |

OTHER PUBLICATIONS

Chen et al., "Comments on the Carriage of MVC over MPEG-2 Systems," ISO/IEC JTC1/SC29/WG11/MG2009, vol. MPEG2009, No. 17025, Oct. 23, 2009, XP002605068, 8 pp.

(Continued)

*Primary Examiner* — Nhon Diep
(74) *Attorney, Agent, or Firm* — Shumaker & Sieffert, P.A.

(57) ABSTRACT

A first descriptor describes an operation point. The second descriptor is a hierarchy descriptor or a hierarchy extension descriptor. The second descriptor has a hierarchy layer index value equal to a value of the second syntax element. A first value of a first syntax element in the first descriptor specifies that an elementary stream indicated by a second syntax element in the first descriptor, when not present in an elementary stream list, shall be added into the list, and an elementary stream indicated by an index in the second descriptor, when not present in the list, shall be added to the list. Responsive to determining the first syntax element has a second value different from the first value, adding the elementary stream indicated by the second syntax element, when not present in the list, into the list, but not the elementary stream indicated by the index in the second descriptor.

26 Claims, 7 Drawing Sheets

(56) References Cited

OTHER PUBLICATIONS

Chen et al., "Carriage of HEVC multi-layer Extension Streams over MPEG-2 Systems", 107. MPEG Meeting; Jan. 13-17, 2014; San Jose, CA; USA; (Motion Picture Expert Group or ISO/IEC JTC1/SC29/WG11) No. m32295, Jan. 8, 2014, XP030060747, 7 pp.
Gérard et al., "Comments on Text of ISO/IEC 13818-1:2013 / PDAM 7—Carriage of Layered HEVC," 109. MPEG Meeting; Jul. 7-11, 2014; Sapporo, JP; (Motion Picture Expert Group or ISO/IEC JTC1/SC29/WG11) No. m34380, 1 Jul. 1, 2014, XP030062753, 32 pp.
Grüneberg et al., "Study Text of ISO-IEC_13818-1_2013_PDAM7_Carriage_of_Lay ered_HEVC," 109. Mpeg Meeting; Jul. 7-11, 2014; Sapporo, JP; (Motion Picture Expert Group or ISO/IEC JTC1/SC29/WG11), No. m34544, Jul. 9, 2014, XP030062917, 30 pp.
Hendry et al., "On Description of Operation Point for MPEG-2 TS L-HEVC", 119. MPEG Meeting; Oct. 20-24, 2014; Strasbourg, FR; (Motion Picture Expert Group or ISO/IEC JTC1/SC29/WG11), No. m34996, Oct. 15, 2014, XP030063368, 7 pp.
International Search Report and Written Opinion from International Application No. PCT/US2016/017499, dated May 4, 2016, 13 pp.
Text of ISO/IEC FDIS 23002-3: "Representation of Auxiliary Video and Supplemental information," ISO/IEC JTC1/SC29/WG11, MPEG Doc, N8768, Marrakech, Morocco, Jan. 19, 2007, 30 pp.
"Text of ISO/IEC 13818-1:2013 PDAM 7 Carnage of Layered HEVC", 108. MPEG Meeting; Mar. 31 through Apr. 4, 2014; Valencia, ES; (Motion Picture Expert Group or ISO/IEC JTC1/SC29/WG11), No. N14319, May 8, 2014, XP030021056, 28 pp.
Response to Written Opinion dated May 4, 2016, from International Application No. PCT/2016/017499, filed Dec. 9, 2016, 6 pp.
International Preliminary Report on Patentability from International Application No. PCT/2016/017499, dated Jan. 16, 2017, 5 pp.
Boyce et al., "Draft high efficiency video coding (HEVC) version 2, combined format range extensions (RExt), scalability (SHVC), and multi-view (MV-HEVC) extensions", 18th Meeting, Jun. 30 through Jul. 9, 2014, Sapporo, JP; (Joint Collaborative Team on Video Coding (JCT-VC) of ITU-T SG 16 WP 3 and ISO/IEC JTC 1/SC 29/WG 11), JCTVC-R1013_v6, Oct. 1, 2014, 545 pp.
ITU-T H.222.0, Amendment 3: Series H: Audiovisual and Multimedia Systems Infrastructure of audiovisual services—Transmission multiplexing and synchronization, Information technology—Generic coding of moving pictures and associated audio information: Systems, Amendment 3: Transport of HEVC video over MPEG-2 systems, The International Telecommunication Union, Jan. 2014, 22 pp.
ITU-T H.265, Series H: Audiovisual and Multimedia Systems, Infrastructure of audiovisual services—Coding of moving video, Advanced video coding for generic audiovisual services, The International Telecommunication Union, Apr. 2015, 634 pp.
ITU-T H.264, Series H: Audiovisual and Multimedia Systems Infrastructure of audiovisual services—Coding of moving video, Advanced video coding for generic audiovisual services, The International Telecommunication Union, Mar. 2005, 343 pp.
ITU-T H.223, Series H: Audiovisual and Multimedia Systems Infrastructure of audiovisual services—Transmission multiplexing and synchronization, Multiplexing protocol for low bit rate multimedia aommunication, The International Telecommunication Union, Jul. 2001, 74 pp.
"International Standard ISO/IEC 23008-2, Information Technology—High efficiency coding and media delivery in heterogeneous environments—Part 2 High Efficiency video coding", First Edition, Dec. 1, 2013, 312 pp.
ITU-T H.222.0, Series H: Audiovisual and Multimedia Systems Infrastructure of audiovisual services—Transmission multiplexing and synchronization,Information technology—Generic coding of moving pictures and associated audio information: Systems, The International Telecommunication Union, Jun. 2012, 228 pp.
"Study of ISO/IEC 13818-1:201x/PDAM 3 Carriage of Layered HEVC," MPEG Meeting, Jul. 7-11, 2014; ISO/IEC JTC1/SC29/WG11, No. N14562, XP030021300, Jul. 11, 2014, 29 pp.

* cited by examiner

SIGNALING OF OPERATION POINTS FOR CARRIAGE OF HEVC EXTENSIONS

This application claims the benefit of U.S. Provisional Patent Application 62/115,089, filed Feb. 11, 2015, the entire content of which is incorporated by reference.

TECHNICAL FIELD

This disclosure relates to video coding and, more particularly, to transport of coded video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques that may improve the design of the HEVC operation point descriptor in the MPEG-2 (Moving Pictures Experts Group) Transport Stream (TS) for carriage. Transporting of coded video data may also be referred to as carriage of coded video data. The techniques of this disclosure may be used for transport of coded video data for an extension of a video coding standard, e.g., an extension of the high efficiency video coding (HEVC) standard. Such extensions may include multiview extensions (e.g., MV-HEVC), scalable extensions (e.g., SHVC), and three-dimensional extensions (e.g., 3D-HEVC). However, it should be understood that the techniques of this disclosure may be used with other transport streams and/or other video compression techniques.

In one aspect, this disclosure describes a method of processing video data, the method comprising: receiving a transport stream that includes a first descriptor, a second descriptor, and a plurality of elementary streams, the first descriptor being a descriptor for an operation point of the video data, the second descriptor being one of: a hierarchy descriptor or a hierarchy extension descriptor; decoding a first syntax element and a second syntax element in the first descriptor, wherein: an elementary stream list is a list of elementary streams of the transport stream that are part of the operation point, the second descriptor has a hierarchy layer index value equal to a value of the second syntax element, a first value of the first syntax element specifies that: an elementary stream indicated by the second syntax element, when not present in the elementary stream list, shall be added into the elementary stream list, the elementary stream indicated by the second syntax element being one of the plurality of elementary streams, and an elementary stream indicated by an embedded layer index in the second descriptor, when not present in the elementary stream list, shall be added to the elementary stream list, the elementary stream indicated by the embedded layer index in the second descriptor being one of the plurality of elementary streams, and in response to determining the first syntax element has a second value different from the first value, adding the elementary stream indicated by the second syntax element, when not present in the elementary stream list, into the elementary stream list, but not adding the elementary stream indicated by the embedded layer index in the second descriptor into the elementary stream list.

In another aspect, this disclosure describes a method of processing video data, the method comprising: generating a first descriptor, the first descriptor being a descriptor of an operation point of the video data; generating a second descriptor, the second descriptor being one of: a hierarchy descriptor or a hierarchy extension descriptor; wherein generating the first descriptor comprises: including a first syntax element and a second syntax element in the first descriptor, wherein: an elementary stream list is a list of elementary streams that are part of the operation point, the second descriptor has a hierarchy layer index value equal to a value of the second syntax element, a first value of the first syntax element specifies that: an elementary stream indicated by the second syntax element, when not present in the elementary stream list, shall be added into the elementary stream list, and an elementary stream indicated by an embedded layer index in the second descriptor, when not present in the elementary stream list, shall be added to the elementary stream list, and a second value of the first syntax element specifies that the elementary stream indicated by the second syntax element, when not present in the elementary stream list, shall be added into the elementary stream list, but not the elementary stream indicated by the embedded layer index in the second descriptor; and including the first descriptor and the second descriptor in a transport stream.

In another aspect, this disclosure describes a device for processing video data, the device comprising: an input interface configured to receive information, the information including a transport stream that includes a first descriptor, a second descriptor, and a plurality of elementary streams, the first descriptor being a descriptor for an operation point of the video data, the second descriptor being one of: a hierarchy descriptor or a hierarchy extension descriptor; and one or more processors configured to: decode a first syntax element and a second syntax element in the first descriptor, wherein: an elementary stream list is a list of elementary streams of the transport stream that are part of the operation point, the second descriptor has a hierarchy layer index value equal to a value of the second syntax element, a first value of the first syntax element specifies that: an elementary stream indicated by the second syntax element, when not present in the elementary stream list, shall be added into the elementary stream list, the elementary stream indicated by the second syntax element being one of the plurality of elementary streams, and an elementary stream indicated by an embedded layer index in the second descriptor, when not present in the elementary stream list, shall be added to the elementary stream list, the elementary stream indicated by the embedded layer index in the second descriptor being one of the plurality of elementary streams, and in response to determining the first syntax element has a second value different from the first value, adding the elementary stream indicated by the second syntax element, when not present in the elementary stream list, into the elementary stream list, but not adding the elementary stream indicated by the embedded layer index in the second descriptor into the elementary stream list.

In another aspect, this disclosure describes a device for processing video data, the device comprising: one or more processors configured to: generate a first descriptor, the first descriptor being a descriptor of an operation point of the video data; generate a second descriptor, the second descriptor being one of: a hierarchy descriptor or a hierarchy extension descriptor; wherein the one or more processors are configured such that, as part of generating the first descriptor, the one or more processors: include a first syntax element and a second syntax element in the first descriptor, wherein: an elementary stream list is a list of elementary streams that are part of the operation point, the second descriptor has a hierarchy layer index value equal to a value of the second syntax element, a first value of the first syntax element specifies that: an elementary stream indicated by the second syntax element, when not present in the elementary stream list, shall be added into the elementary stream list, and an elementary stream indicated by an embedded layer index in the second descriptor, when not present in the elementary stream list, shall be added to the elementary stream list, and a second value of the first syntax element specifies that the elementary stream indicated by the second syntax element, when not present in the elementary stream list, shall be added into the elementary stream list, but not the elementary stream indicated by the embedded layer index in the second descriptor; and include the first descriptor and the second descriptor in a transport stream; and an output interface configured to output an encoded version of the video data.

In another aspect, this disclosure describes a device for processing video data, the device comprising means for receiving a transport stream that includes a first descriptor, a second descriptor, and a plurality of elementary streams, the first descriptor being a descriptor for an operation point of the video data, the second descriptor being one of: a hierarchy descriptor or a hierarchy extension descriptor; means for decoding a first syntax element and a second syntax element in the first descriptor, wherein: an elementary stream list is a list of elementary streams of the transport stream that are part of the operation point, the second descriptor has a hierarchy layer index value equal to a value of the second syntax element, a first value of the first syntax element specifies that: an elementary stream indicated by the second syntax element, when not present in the elementary stream list, shall be added into the elementary stream list, the elementary stream indicated by the second syntax element being one of the plurality of elementary streams, and an elementary stream indicated by an embedded layer index in the second descriptor, when not present in the elementary stream list, shall be added to the elementary stream list, the elementary stream indicated by the embedded layer index in the second descriptor being one of the plurality of elementary streams, and means for adding, in response to determining the first syntax element has a second value different from the first value, the elementary stream indicated by the second syntax element, when not present in the elementary stream list, into the elementary stream list, but not adding the elementary stream indicated by the embedded layer index in the second descriptor into the elementary stream list.

In another aspect, this disclosure describes a device for processing video data, the device comprising means for generating a first descriptor, the first descriptor being a descriptor of an operation point of the video data; means for generating a second descriptor, the second descriptor being one of: a hierarchy descriptor or a hierarchy extension descriptor; wherein the means for generating the first descriptor comprises: means for including a first syntax element and a second syntax element in the first descriptor, wherein: an elementary stream list is a list of elementary streams that are part of the operation point, the second descriptor has a hierarchy layer index value equal to a value of the second syntax element, a first value of the first syntax element specifies that: an elementary stream indicated by the second syntax element, when not present in the elementary stream list, shall be added into the elementary stream list, and an elementary stream indicated by an embedded layer index in the second descriptor, when not present in the elementary stream list, shall be added to the elementary stream list, and a second value of the first syntax element specifies that the elementary stream indicated by the second syntax element, when not present in the elementary stream list, shall be added into the elementary stream list, but not the elementary stream indicated by the embedded layer index in the second descriptor; and means for including the first descriptor and the second descriptor in a transport stream.

In still another aspect, this disclosure describes a computer-readable data storage medium comprising instructions stored thereon that, when executed, cause a device for processing video data to perform the methods of the paragraphs above and described in this disclosure.

The details of one or more examples are set forth in the accompanying drawings and the description below. Other features, objects, and advantages will be apparent from the description and drawings, and from the claims.

DETAILED DESCRIPTION

Figure 1:
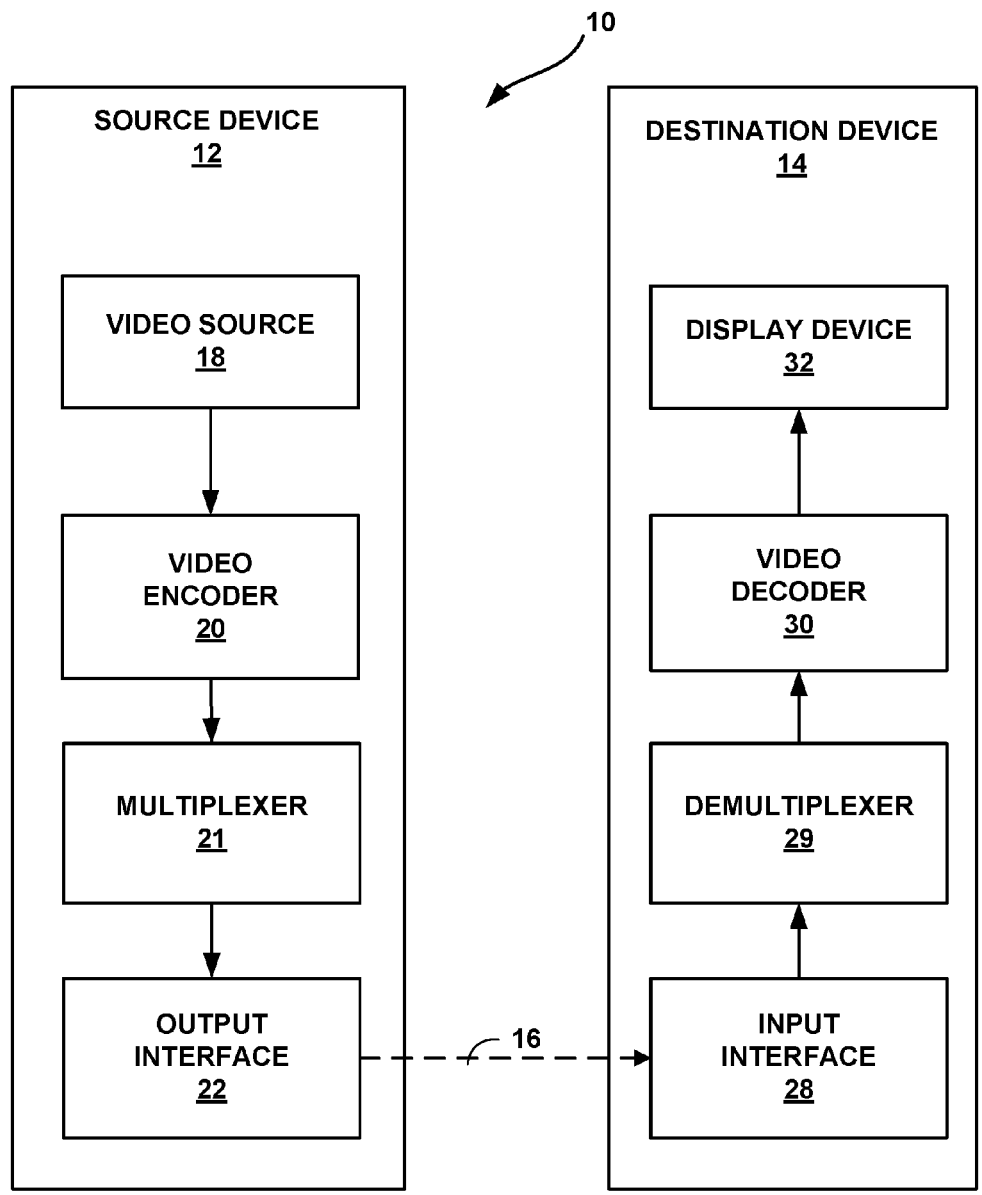
FIG. 1 is a block diagram illustrating an example video encoding and decoding system that may utilize techniques for transporting video data coded according to extensions of a video coding standard.

In general, this disclosure describes techniques related to Moving Picture Experts Group (MPEG)-2 Systems level data for media data. The MPEG-2 Systems specification generally describes how two or more data streams are multiplexed together to form a single data stream. This disclosure describes techniques related to MPEG-2 Systems data for multi-layer video data. For instance, this disclosure describes changes that potentially may improve the design of the High Efficiency Video Coding (HEVC) operation point descriptor in MPEG-2 transport streams (TS's) for carriage of HEVC extensions. However, the techniques of this disclosure are not necessarily limited to the MPEG-2 TS or HEVC.

For ease of description only, the techniques of this disclosure are generally described for carriage (e.g., transport) of video data coded in accordance with an extension to a video coding standard (e.g., an extension to HEVC, also referred to as ITU-T H.265). Such extensions may include multiview, three-dimensional, and/or scalable extensions. Thus, the techniques of this disclosure may be applied to multiview HEVC (MV-HEVC), three-dimensional HEVC (3D-HEVC), and scalable HEVC (SHVC).

Multi-layer video data, e.g., multi-view video data and/or video data with multiple scalable layers, may include designated operation points. In general, an operation point describes a subset of layers (e.g., views) of a full set of layers of multi-layer video data. The operation point may also identify target output layers, that is, layers for which data is to be output. In some instances, data of a layer may be included in an operation point only for use as a reference layer, and hence, such a layer would not be considered a target output layer. A reference layer may be a layer used for reference by another layer for encoding and decoding.

HEVC operation points are generally signaled in an HEVC operation point descriptor by specifying references to elementary streams, as described in more detail below. However, some designs of the HEVC operation point descriptor allow a list of elementary streams for a target operation point to include a layer or an elementary stream twice. Also, in some cases, not all layers that need to be decoded are signaled in some designs of the HEVC operation point descriptor because the information for such layers is available elsewhere. In some examples, because a particular layer is not signaled, certain syntax elements associated with the layer may not be available for the video decoder.

The techniques described in this disclosure may address one or more of the issues described above. However, it is not a necessity that the techniques address the issues described above. For instance, the disclosure describes examples that may ensure that an elementary stream/layer is not included multiple times in the list of elementary streams of the operation point. The disclosure also describes examples of including information in the bitstream that a video decoder receives that includes syntax elements associated with a layer even if that layer is not explicitly signaled as being in the list of elementary streams of the operation point.

FIG. 1 is a block diagram illustrating an example video encoding and decoding system 10 that may utilize techniques for transporting video data coded according to extensions of a video coding standard. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablets, televisions, cameras, display devices, digital media players, video gaming consoles, video streaming device, or the like. In some examples, source device 12 and destination device 14 may be equipped for wireless communication. Thus, in some examples, source device 12 and destination device 14 are wireless communication devices.

In the example of FIG. 1, source device 12 includes a video source 18, video encoder 20, a multiplexer 21, and an output interface 22. In some examples, output interface 22 includes a modulator/demodulator (modem) and/or a transmitter. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. However, the techniques described in this disclosure may be applicable to video coding in general, and may be applied to wireless and/or wired applications.

Video encoder 20 may encode captured, pre-captured, or computer-generated video data. Source device 12 may transmit the encoded video data directly to destination device 14 via output interface 22 of source device 12. The encoded video data may also (or alternatively) be stored onto a storage device for later access by destination device 14 or other devices, for decoding and/or playback. The encoded video information may then be output by output interface 22 onto a computer-readable medium 16.

Destination device 14 includes an input interface 28, a demultiplexer 29, a video decoder 30, and a display device 32. In some examples, input interface 28 may include a receiver and/or a modem. Input interface 28 of destination device 14 receives the encoded video data over a link 16. The encoded video data communicated over link 16, or provided on storage device 33, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. For instance, source device 12 may include a storage device configured to store the encoded video data. In some examples, encoded data may be accessed from the storage device by input interface 28. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include web servers (e.g., for a website), FTP servers, network attached storage (NAS) devices, or local disk drives, or other servers configured to provide files. Destination device 14 may access the encoded video data through any standard data connection, including an Internet connection. This may include a wireless channel (e.g., a Wi-Fi connection), a wired connection (e.g., a DSL modem, a cable modem), or a combination of both that is suitable for accessing encoded video data stored on a file server. The transmission of encoded video data from the storage device may be a streaming transmission, a download transmission, or a combination thereof.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, in accordance with this disclosure, multiplexer 21 of source device 12 may be configured to apply the techniques for transporting video data coded according to extensions of a video coding standard, while demultiplexer 29 may receive such data for processing and may forward the processed video data to another device or component, e.g., video decoder 30. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for transporting video data coded according to extensions of a video coding standard may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units.

Display device 32 may be integrated with, or may be external to, destination device 14. In some examples, destination device 14 may include an integrated display device and may also be configured to interface with an external display device. In other examples, destination device 14 may be a display device. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20, multiplexer 21, demultiplexer 29, and video decoder 30 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware, or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium. Thus, while video decoder 30 may be referred to as "receiving" certain information, the receiving of information does not necessarily occur in real- or near-real-time and may be retrieved from a medium at some time after storage.

Moreover, although not specifically illustrated in FIG. 1, some of the example techniques described in this disclosure may be implemented by some external means, such as a media aware network element (MANE). The MANE may receive video data from video encoder 20 and signal a bitstream that video decoder 30 receives. In some examples, the MANE may receive and process a transport stream. Accordingly, at times, when the disclosure describes signaling, such signaling may be performed by video encoder 20 or by some external means, such as the MANE.

Video encoder 20 and video decoder 30 may operate according to a video coding standard. For example, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC. More generally, video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In another example video encoder 20 and video decoder 30 may encode and decode video data using another video coding standard, such as the High Efficiency Video Coding (HEVC) standard, also referred to as the H.265 video coding standard. HEVC has been finalized by the Joint Collaboration Team on Video Coding (JCT-VC) of ITU-T Video Coding Experts Group (VCEG) and ISO/IEC Motion Picture Experts Group (MPEG). The latest HEVC draft specification is referred to as HEVC WD hereinafter.

In addition, the multiview extension to HEVC, namely MV-HEVC, is also being developed by the JCT-3V. The scalable extension to HEVC, named SHVC, is also being developed by the JCT-VC. The latest document including the specification for HEVC, HEVC range extension, SHVC and MV-HEVC is available from http://phenix.int-evry.fr/jct/doc_end_user/documents/18_Sapporo/wg11/JCTVC-R1013-v6.zip.

In HEVC and other video coding standards, a video sequence typically includes a series of pictures. Pictures may also be referred to as "frames." To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU).

To generate a coded CTU, video encoder 20 may divide the coding tree blocks of a CTU into coding blocks, hence the name "coding tree units." A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU. Video encoder 20 may use intra prediction or inter prediction to generate the predictive blocks for a PU.

After video encoder 20 generates predictive blocks for one or more PUs of a CU, video encoder 20 may generate residual blocks for the CU. Each sample in a residual block of the CU may indicate a difference between a sample in a predictive block of a PU of the CU and a corresponding sample in a coding block of the CU. Furthermore, video encoder 20 may decompose the residual blocks of a CU into one or more transform blocks. A transform unit (TU) of a CU may be a transform block of luma samples, two corresponding transform blocks of chroma samples, and syntax structures used to transform the transform block samples. Video encoder 20 may apply one or more transforms to a transform block to generate a coefficient block for a TU. After generating a coefficient block, video encoder 20 may quantize the coefficient block. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output entropy-encoded syntax elements in a bitstream. The bitstream may also include syntax elements that are not entropy encoded.

The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). A RBSP may be a syntax structure containing an integer number of bytes that is encapsulated within a NAL unit. In some instances, an RB SP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RB SP for supplemental enhancement information (SEI), and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may obtain syntax elements from the bitstream. For example, video decoder 30 may parse the bitstream to decode syntax elements from the bitstream. Video decoder 30 may reconstruct the pictures of the video data based at least in part on the syntax elements obtained (e.g., decoded) from the bitstream. The process to reconstruct the video data may be generally reciprocal to the process performed by video encoder 20. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture.

In multi-view coding, there may be multiple views of the same scene from different viewpoints. In the context of multi-view coding, the term "access unit" may be used to refer to the set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier. In some examples, a view component may be a texture view component (i.e., a texture picture) or a depth view component (i.e., a depth picture).

In MV-HEVC and SHVC, a video encoder may generate a bitstream that comprises a series of NAL units. Different NAL units of the bitstream may be associated with different layers of the bitstream. A layer may be defined as a set of VCL NAL units and associated non-VCL NAL units that have the same layer identifier. A layer may be equivalent to a view in multi-view video coding. In multi-view video coding, a layer can contain all view components of the same layer with different time instances. Each view component may be a coded picture of the video scene belonging to a specific view at a specific time instance. In some examples of multi-view or 3-dimensional video coding, a layer may contain either all coded depth pictures of a specific view or coded texture pictures of a specific view. In other examples of 3D video coding, a layer may contain both texture view components and depth view components of a specific view. Similarly, in the context of scalable video coding, a layer typically corresponds to coded pictures having video characteristics different from coded pictures in other layers. Such video characteristics typically include spatial resolution and quality level (e.g., Signal-to-Noise Ratio). In HEVC and its extensions, temporal scalability may be achieved within one layer by defining a group of pictures with a particular temporal level as a sub-layer.

For each respective layer of the bitstream, data in a lower layer may be decoded without reference to data in any higher layer. In scalable video coding, for example, data in a base layer may be decoded without reference to data in an enhancement layer. In general, NAL units may only encapsulate data of a single layer. Thus, NAL units encapsulating data of the highest remaining layer of the bitstream may be removed from the bitstream without affecting the decodability of data in the remaining layers of the bitstream. In multi-view coding, higher layers may include additional view components. In SHVC, higher layers may include signal to noise ratio (SNR) enhancement data, spatial enhancement data, and/or temporal enhancement data. In MV-HEVC and SHVC, a layer may be referred to as a "base layer" if a video decoder can decode pictures in the layer without reference to data of any other layer. The base layer may conform to the HEVC base specification (e.g., Rec. ITU-T H.2651 ISO/IEC 23008-2).

In scalable video coding, layers other than the base layer may be referred to as "enhancement layers" and may provide information that enhances the visual quality of video data decoded from the bitstream. Scalable video coding can enhance spatial resolution, signal-to-noise ratio (i.e., quality) or temporal rate. In scalable video coding (e.g., SHVC), a "layer representation" may be a coded representation of a spatial layer in a single access unit. For ease of explanation, this disclosure may refer to view components and/or layer representations as "view components/layer representations" or simply "pictures."

Multi-view coding supports inter-view prediction. Inter-view prediction is similar to the inter prediction used in HEVC and may use the same syntax elements. However, when a video coder performs inter-view prediction on a current video unit (such as a PU), video encoder 20 may use, as a reference picture, a picture that is in the same access unit as the current video unit, but in a different view. In contrast, conventional inter prediction only uses pictures in different access units as reference pictures.

In multi-view coding, a view may be referred to as a "base view" if a video decoder (e.g., video decoder 30) can decode pictures in the view without reference to pictures in any other view. When coding a picture in one of the non-base views, a video coder (such as video encoder 20 or video decoder 30) may add a picture into a reference picture list if the picture is in a different view but within a same time instance (i.e., access unit) as the picture that the video coder is currently coding. Like other inter prediction reference pictures, the video coder may insert an inter-view prediction reference picture at any position of a reference picture list.

For instance, NAL units may include headers (i.e., NAL unit headers) and payloads (e.g., RBSPs). The NAL unit headers may include nuh_reserved_zero_6bits syntax elements, which may also be referred to as nuh_layer_id syntax elements. NAL units that have nuh_layer_id syntax elements that specify different values belong to different "layers" of a bitstream. Thus, in multi-view coding, MV-HEVC, SVC, or SHVC, the nuh_layer_id syntax element of the NAL unit specifies a layer identifier (i.e., a layer ID) of the NAL unit. The nuh_layer_id syntax element of a NAL unit is equal to 0 if the NAL unit relates to a base layer in multi-view coding, MV-HEVC or SHVC. Data in a base layer of a bitstream may be decoded without reference to data in any other layer of the bitstream. If the NAL unit does not relate to a base layer in multi-view coding, MV-HEVC or SHVC, the nuh_layer_id syntax element may have a non-zero value.

In multi-view coding, different layers of a bitstream may correspond to different views. In SVC or SHVC, layers other than the base layer may be referred to as "enhancement layers" and may provide information that enhances the visual quality of video data decoded from the bitstream.

Furthermore, some pictures within a layer may be decoded without reference to other pictures within the same layer. Thus, NAL units encapsulating data of certain pictures of a layer may be removed from the bitstream without affecting the decodability of other pictures in the layer. Removing NAL units encapsulating data of such pictures may reduce the frame rate of the bitstream. A subset of pictures within a layer that may be decoded without reference to other pictures within the layer may be referred to herein as a "sub-layer" or a "temporal sub-layer." Thus, one type of scalable dimension is the temporal dimension.

For example, in temporal scalability, a set of video data may support various frame rates or playback rates, e.g., 15 frames per second (FPS), 30 FPS, 60 FPS, and 120 FPS. A given temporal level may include all pictures at that level and lower levels. For instance, continuing the previous example, a temporal level of 0 may correspond to 15 FPS, a temporal level of 1 may include pictures of temporal level 0 as well as pictures at temporal level 1 to support 30 FPS, a temporal level of 2 may include pictures of temporal levels 0 and 1 as well as pictures at temporal level 2 to support 60 FPS, and so on.

A temporal identifier, or TemporalID, may be signaled as representative of the temporal level to which a particular picture belongs. For instance, NAL units may include temporal_id syntax elements. The temporal_id syntax element of a NAL unit specifies a temporal identifier of the NAL unit. The temporal identifier of a NAL unit identifies a temporal sub-layer with which the NAL unit is associated. Thus, each temporal sub-layer of a bitstream may be associated with a different temporal identifier. If the temporal identifier of a first NAL unit is less than the temporal identifier of a second NAL unit, the data encapsulated by the first NAL unit may be decoded without reference to the data encapsulated by the second NAL unit.

A bitstream may be associated with a plurality of operation points. In some examples, each operation point of a bitstream may be associated with a set of layer identifiers (i.e., a set of nuh_reserved_zero_6bits values or nuh_layer_id values) and a temporal identifier. The set of layer identifiers may be denoted as OpLayerIdSet and the temporal identifier may be denoted as TemporalID. If a NAL unit's layer identifier is in an operation point's set of layer identifiers and the NAL unit's temporal identifier is less than or equal to the operation point's temporal identifier, the NAL unit is associated with the operation point. Thus, an operation point may be a bitstream created from another bitstream by operation of the sub-bitstream extraction process with this other bitstream, a target highest TemporalId, and a target layer identifier list as inputs to the sub-bitstream extraction process. The operation point may include each NAL unit that is associated with the operation point. In some examples, the operation point does not include VCL NAL units that are not associated with the operation point.

As indicated above, an operation point describes a subset of layers (e.g., views) of a full set of layers of multi-layer video data. The operation point may also identify target output layers, that is, layers for which data (e.g., decoded pictures) are to be output. In some instances, data of a layer may be included in an operation point only for use as a reference layer (e.g., only for inter-layer or inter-view prediction of layer or view that is to be displayed, where in the reference layer or view is not displayed), and hence, such a layer would not be considered a target output layer.

HEVC and other video coding standards specify profiles, tiers, and levels. Profiles, tiers, and levels specify restrictions on bitstreams and hence limits on the capabilities needed to decode the bitstreams. Profiles, tiers, and levels may also be used to indicate interoperability points between individual decoder implementations. Each profile specifies a subset of algorithmic features and tools present in a video coding standard. Thus, a "profile" is a subset of an entire bitstream syntax that is specified by an applicable video coding standard. Video encoders are not required to make use of all features supported in a profile. Each level of a tier may specify a set of limits on the values that syntax elements and variables may have. Thus, a "level" corresponds to limitations of the decoder resource consumption, such as, for example, decoder memory and computation, which are related to the resolution of the pictures, bit rate, and block processing rate. The same set of tier and level definitions may be used with all profiles, but individual implementations may support a different tier and within a tier a different level for each supported profile. For any given profile, a level of a tier may generally correspond to a particular decoder processing load and memory capability. Capabilities of video decoders may be specified in terms of the ability to decode video streams conforming to the constraints of particular profiles, tiers, and levels. For each such profile, the tier and level supported for that profile may also be expressed. Some video decoders may not be able to decode particular profiles, tiers, or levels.

This disclosure describes techniques that may improve the HEVC operation point descriptor in MPEG-2 Transport Stream (TS) for carriage of HEVC extension bitstreams. For instance, in accordance with a technique of this disclosure, multiplexer 21 and/or demultiplexer 29 may be configured to transport video data (that is, send or receive video data) that is coded according to a video coding standard, such as HEVC, an extension of a video coding standard (e.g., extensions of the HEVC standard such as SHVC or MV-HEVC), or other as-yet undeveloped video coding standards. In general, multiplexer 21 may encapsulate encoded video data to form a data stream, e.g., substantially in accordance with MPEG-2 Systems and the techniques of this disclosure, while demultiplexer 29 may receive and decapsulate encapsulated data, e.g., video data encoded according to an extension of a video coding standard.

The latest specification of MPEG-2 TS is the ITU-T recommendation H.222.0, 2012 June version, wherein the support of AVC and AVC extensions are provided. An amendment of MPEG-2 TS for HEVC has also been developed. The latest document, "Text of ISO/IEC 13818-1: 2013/Final Draft Amendment 3—Transport of HEVC video over MPEG-2 Systems," is available from in MPEG document w13656, July 2013. Recently, an amendment of MPEG-2 TS for carriage of layered HEVC, referred to as MPEG-2 TS for L-HEVC, has been started. The latest document is "Text of ISO/IEC 13818-1:2013/DAM 3—Carriage of Layered HEVC", hereinafter "DAM3". The term "Layered HEVC" refers to extensions of the HEVC standard that use multiple layers, such as SHVC, MV-HEVC, and 3D-HEVC.

The MPEG-2 Systems specification describes how compressed multimedia (video and audio) data streams may be multiplexed together with other data to form a single data stream suitable for digital transmission or storage. The MPEG-2 Systems specification describes an elementary stream, which is a single, digitally coded (possibly MPEG-compressed) component of a program (also sometimes spelled "programme"). For example, the coded video or audio part of the program can be an elementary stream. An elementary stream is firstly converted into a packetized elementary stream (PES) before multiplexed into a program stream or a transport stream. Within the same program, a stream_id syntax element is used to distinguish the PES-packets belonging to one elementary stream from another. Each PES packet may contain one or more NAL units or a NAL unit may be divided among multiple PES packets.

In the MPEG-2 Systems specification, program streams and transport streams are two alternative multiplexes that target different applications. Program streams are biased for the storage and display of a single program from a digital storage service and a program stream is intended for use in error-free environments because it can be susceptible to errors.

A program stream includes the elementary streams belonging to it and usually contains packets with variable length packets. In a program stream, PES-packets that are derived from the contributing elementary streams are organized into 'packs.' A pack includes a pack-header, an optional system-header and any number of PES-packets taken from any of the contributing elementary streams, in any order. The system header contains a summary of the characteristics of the program stream such as: its maximum data rate; the number of contributing video and audio elementary streams; and further timing information. Video decoder 30 may use the information contained in a system header to determine whether video decoder 30 is capable of decoding the program stream or not.

Transport streams are intended for the simultaneous delivery of a number of programs over potentially error-prone channels. A transport stream is a multiplex devised for multi-program applications such as broadcasting, so that a single transport stream can accommodate many independent programs. A transport stream includes a succession of transport packets, and each of the transport packets is 188-bytes long. The use of short, fixed length packets means that the transport stream is not as susceptible to errors as the program stream. Further, each 188-byte-long transport packet is easily given additional error protection by processing it through a standard error protection process, such as Reed-Solomon encoding. The improved error resilience of the transport stream means that it has a better chance of surviving the error-prone channels to be found in a broadcast environment, for example. It might seem that the transport stream is clearly the better of the two multiplexes with its increased error resilience and ability to carry many simultaneous programs. However, the transport stream is a more sophisticated multiplex than the program stream and is consequently more difficult to create and to demultiplex.

The first byte of a transport packet is a synchronization byte which, in some instances, is 0x47. A single transport stream may carry many different programs, each comprising many packetized elementary streams. A Packet Identifier (PID) field is used to distinguish transport packets containing the data of one elementary stream from those carrying the data of other elementary streams. In some instances, the PID is 13 bits. It may be the responsibility of multiplexer 21 to ensure that each elementary stream is awarded a unique PID value.

Although it is clear based on a PID value which elementary stream a transport packet belongs to, video decoder 30 may need to know which elementary streams belong to which program. Accordingly, a transport stream comprises program specific information (PSI) to explicitly specify relationships between the programs and the component elementary streams. In other words, the transport stream may include transport packets containing PSI.

The PSI may include a program association table (PAT). The program association table includes a complete list of all the programs available in a transport stream. In some examples, the PAT always has the PID value 0. Each program is listed along with the PID value of the transport packets that contain the program map table of the program.

Furthermore, the PSI may include one or more Program Map Tables (PMTs). Each program carried in a transport stream has an associated PMT. The PAT may specify the PID value of transport packets that contain the PMT for a program. The PMT for a program gives details about the program and the elementary streams that comprise the program. For example, the PMT for a program with program number 3 may specify the program contains transport packets with PID values 33, 57, and 60. In this example, transport packets with PID values equal to 33 may include an elementary stream containing encoded video data, transport packets with PID values equal to 57 may include English audio data, and transport packets with PID values equal to 60 may include Chinese audio data. A PMT may include details regarding more than one program.

The basic PMT for a program may include some of the many descriptors specified within the MPEG-2 systems specification. Such descriptors convey further information about a program or its component elementary streams. The descriptors may include video encoding parameters, audio encoding parameters, language identification, pan-and-scan information, conditional access details, copyright information and so on. A broadcaster or other user may define additional private descriptors if required.

The descriptors are separate from the encoded video data. Thus, a device, such as a Media Aware Network Element (MANE) or video decoder, may be able to use a descriptor to perform various functions on transport streams and program streams without decoding or otherwise analyzing encoded video data. For instance, if the video data is encoded using HEVC, the device does not need to be configured to decode HEVC-encoded video data in order to use the descriptor to perform particular functions on transport or program streams. For instance, the device may be able to use the descriptors as part of a process to determine whether to forward particular program elements to a destination device or decode particular elementary streams.

The descriptors for a program having video-related component elementary streams may include one or more hierarchy descriptors. A hierarchy descriptor is designed to signal the hierarchy of the sub-bitstreams of different elementary streams. The hierarchy descriptor provides information identifying the program elements containing components of hierarchically-coded video, audio, and private streams. The private streams may include metadata, such as a stream of program specific information. In general, a program element is one of the data or elementary streams included in a program (i.e., a component elementary stream of the program). In MPEG-2 transport streams, program elements are usually packetized. In MPEG-2 program streams, the program elements are not packetized.

In some instances, each respective temporal sub-layer of each respective layer of a program may correspond to a different program component (e.g., elementary stream) of the program. In other instances, each respective layer of a program corresponds to a different elementary stream. Furthermore, in some instances, two or more elementary streams may correspond to different temporal sub-layers of the same layer of a program while a single elementary stream may correspond to all temporal sub-layers of another layer of the same program. As indicated above, the descriptors may include hierarchy descriptors. Each respective hierarchy descriptor provides information regarding a corresponding program component (i.e., elementary stream). For instance, a hierarchy descriptor corresponding to a particular elementary stream may include a syntax element specifying another elementary stream needed to decode video data of the particular elementary stream. In one example, a hierarchy descriptor corresponding to an elementary stream for a particular temporal sub-layer may include a syntax element specifying an embedded temporal sub-layer needed to decode the particular temporal sub-layer.

The embedded temporal sub-layer may be "embedded" in the sense that decoding of the embedded temporal sub-layer is required for successful decoding of the particular temporal sub-layer. Furthermore, the hierarchy descriptor may include syntax elements specifying whether a temporal sub-layer corresponding to the hierarchy descriptor provides temporal scalability (e.g., increases the frame rate) relative to the embedded temporal sub-layer, provides spatial scalability (e.g., increases picture resolution) relative to the embedded temporal sub-layer, provides quality scalability (e.g., enhances signal-to-noise quality or fidelity) relative to the embedded temporal sub-layer, and so on.

Table 2-49, below, specifies the syntax of a hierarchy descriptor as defined in DAM3.

TABLE 2-49

Hierarchy descriptor

| Syntax | No. of bits | Mnemonic |
|---|---|---|
| hierarchy_descriptor ( ) { | | |
|   descriptor_tag | 8 | uimsbf |
|   descriptor_length | 8 | uimsbf |
|   no_view_scalability_flag | 1 | bslbf |
|   no_temporal_scalability_flag | 1 | bslbf |
|   no_spatial_scalability_flag | 1 | bslbf |
|   no_quality_scalability_flag | 1 | bslbf |
|   hierarchy_type | 4 | uimsbf |
|   reserved | 2 | bslbf |
|   hierarchy_layer_index | 6 | uimsbf |
|   tref_present_flag | 1 | bslbf |
|   reserved | 1 | bslbf |
|   hierarchy_embedded_layer_index | 6 | uimsbf |
|   reserved | 2 | bslbf |
|   hierarchy_channel | 6 | uimsbf |
| } | | |

In Table 2-49, hierarchy_layer_index is a 6-bit field that defines a unique index of the associated program element in a table of coding layer hierarchies. Indices shall be unique within a single program definition. For video sub-bitstreams of HEVC video streams conforming to one or more profiles defined in Annex F of Rec. ITU-T H.265|ISO/IEC 23008-2, this is the program element index, which is assigned in a way that the bitstream order will be correct if associated dependency layers of the video sub-bitstreams of the same HEVC access unit are re-assembled in increasing order of hierarchy_layer_index. In other words, the hierarchy_layer_index of a hierarchy descriptor identifies the program element (i.e., elementary stream) that corresponds to the hierarchy descriptor.

Furthermore, in Table 2-49, hierarchy_embedded_layer_index is a 6-bit field defining the hierarchy_layer_index of the program element that needs to be accessed and be present in decoding order before decoding of the elementary stream associated with this hierarchy_descriptor. hierarchy_embedded_layer_index is undefined if the hierarchy_type value is 15. In other words, the hierarchy_embedded_layer_index of a hierarchy descriptor identifies an elementary stream on which the elementary stream corresponding to the hierarchy descriptor depends.

In addition to the one or more hierarchy descriptors, the descriptors signaled in a MPEG-2 transport or program stream may include one or more hierarchy extension descriptors. Each respective hierarchy extension descriptor in the MPEG-2 transport or program stream may correspond to a respective elementary stream. Each hierarchy extension descriptor may provide additional information regarding a corresponding elementary stream. As indicated above, an elementary stream may correspond to one or more temporal sub-layers or may correspond to a layer as a whole. In other words, an elementary stream may include encoded video data of one or more temporal sub-layers or may correspond to a layer as a whole. Hence, a hierarchy extension descriptor may correspond to an elementary stream corresponding to one or more temporal sub-layers or may correspond to a layer as a whole.

When a hierarchy extension descriptor is present, the hierarchy extension descriptor is used to specify the dependencies of the elementary stream corresponding to the elementary stream. For instance, a hierarchy extension descriptor corresponding to a particular elementary stream may indicate multiple elementary streams that are required to be decoded to successfully decode the elementary stream corresponding to the hierarchy extension descriptor. In contrast, a hierarchy descriptor is only capable of indicating one elementary stream required for successful decoding of an elementary stream corresponding to the hierarchy descriptor. Table 2-103deciens, below, indicates a syntax of a hierarchy extension descriptor, as specified in DAM3.

TABLE 2-103 deciens - HEVC hierarchy extension descriptor

| Syntax | No. of bits | Mnemonic |
|---|---|---|
| HEVC_hierarchy_extension_descriptor( ) { | | |
|   extension_dimension_bits | 16 | bslbf |
|   hierarchy_layer_index | 6 | uimsbf |
|   temporal_id | 3 | uimsbf |
|   nuh_layer_id | 6 | uimsbf |
|   tref_present_flag | 1 | bslbf |
|   reserved | 2 | bslbf |
|   num_embedded_layers | 6 | uimsbf |
|   reserved | 2 | bslbf |
|   hierarchy_channel | 6 | uimsbf |
|   for ( i = 0 ; i < num_embedded_layers ; i++ ) { | | |
|     reserved | 2 | bslbf |
|     hierarchy_ext_embedded_layer_index[i] | 6 | uimsbf |
|   } | | |
| } | | |

In Table 2-103deciens, hierarchy_layer_index is a 6-bit field that defines a unique index of the associated program element in a table of coding layer hierarchies. Indices shall be unique within a single program definition. For video sub-bitstreams of HEVC video streams conforming to one or more profiles defined in Annex G or H of Rec. ITU-T H.265|ISO/IEC 23008-2, this is the program element index, which is assigned in a way that the bitstream order will be correct if associated dependency layers of the video sub-bitstreams of the same access unit are re-assembled in increasing order of hierarchy_layer_index. Thus, the hierarchy_layer_index of a hierarchy extension descriptor identifies the elementary stream corresponding to the hierarchy extension descriptor.

nuh_layer_id is a 6-bit field specifying the highest nuh_layer_id of the NAL units in the elementary stream associated with this HEVC_hierarchy_extension_descriptor( ).

temporal_id is a 3-bit field specifying the highest TemporalId of the NAL units in the elementary stream associated with this HEVC_hierarchy_extension_descriptor( ).

num_embedded_layers is a 6-bit field specifying the number of direct dependent program elements that needs to be accessed and be present in decoding order before decoding of the elementary stream associated with this HEVC_hierarchy_extension_descriptor( ).

hierarchy_ext_embedded_layer_index is a 6-bit field defining the hierarchy_layer_index of the program element that needs to be accessed and be present in decoding order before decoding of the elementary stream associated with this hierarchy_extension_descriptor. This field is undefined if the hierarchy_type value is 15.

In addition to the hierarchy descriptor and hierarchy extension descriptors, a transport stream may include an HEVC operation point descriptor. HEVC operation points are signaled in an HEVC operation point descriptor by specifying the references to the elementary streams corresponding to layers in the operation points. As described in DAM3, the HEVC operation point descriptor provides a method to indicate a profile and a level for one or more HEVC operation points. Destination device 14 may use operation point descriptors included in a bitstream to select one of the operation points to be decoded and ultimately presented (e.g., displayed) to a user. Rather than passing data for all of the views or layers to video decoder 30 upon receipt, destination device 14 may send only the views of a selected operation point to video decoder 30. For instance, destination device 14 may discard data for views that will not be decoded. Additionally or alternatively, an intermediate network device (e.g., a media aware network element (MANE)) may discard data for views or layers that do not correspond to a requested operation point (e.g., to better utilize bandwidth). Destination device 14 may select an operation point based on the highest quality supported one of the operation points for a bitstream and/or based on an available amount of network bandwidth.

Table 2-103noniens below indicates the syntax of the HEVC operation point descriptor as defined in DAM3.

TABLE 2-103

| noniens - HEVC operation point descriptor | | |
|---|---|---|
| Syntax | No. Of bits | Mnemonic |
| HEVC_operation_point_descriptor( ) { | | |
| num_ptl | 8 | uimsbf |
| for ( i = 0; i < num_ptl; i++, i++ ) { | | |
| profile_tier_level_info[i] | 96 | bslbf |
| } | | |
| operation_points_count | 8 | uimsbf |
| for ( i = 0; i < operation_points_count; i++ ) { | | |
| target_ols[i] | 8 | uimsbf |
| ES_count[i] | 8 | uimsbf |
| <EMPHASIS>for ( j = 0; j < ES_count; j++ ) { | | |
| output_layer_flag[i][j] | 1 | bslbf |
| prepend_dependencies[i][j] | 1 | bslbf |
| ES_reference[i][j] | 6 | uimsbf |
| ptl_ref_idx[i][j] | 8 | uimsbf |
| }</EMPHASIS> | | |
| reserved | 1 | bslbf |

TABLE 2-103-continued

| noniens - HEVC operation point descriptor | | |
|---|---|---|
| Syntax | No. Of bits | Mnemonic |
| avg_bit_rate_info_flag[i] | 1 | bslbf |
| max_bit_rate_info_flag[i] | 1 | bslbf |
| constant_frame_rate_info_idc[i] | 2 | uimsbf |
| applicable_temporal_id[i] | 3 | uimsbf |
| if ( constant_frame_rate_info_idc[i] > 0 ) { | | |
| reserved | 4 | bslbf |
| frame_rate_indicator[i] | 12 | uimsbf |
| } | | |
| if ( avg_bit_rate_info_flag[i] == '1' ) { | | |
| avg_bit_rate[i] | 24 | uimsbf |
| } | | |
| if ( max_bit_rate_info_flag[i] == '1' ) { | | |
| max_bit_rate[i] | 24 | uimsbf |
| } | | |
| } | | |
| } | | |

There may be certain issues in the design in DAM3 for the HEVC operation point descriptor (i.e., the syntax structure of the HEVC operation point descriptor). The following paragraphs describe two of the problems in the current design of the HEVC operation point descriptor defined in DAM3.

Firstly, as shown in Table 2-103noniens, the HEVC operation point descriptor includes prepend_dependencies[i][j] syntax elements. However, in DAM3, the semantics of prepend_dependencies[i][j] equal to 0 are missing. Furthermore, in the design of DAM3, it is possible that an elementary stream (e.g., an elementary stream corresponding to a layer) is included twice in the list of elementary streams for the target operation point. The problem of more than one inclusion can happen in either of the following scenarios:

1. When a layer is explicitly signaled as part of an operation point by signaling its ES_reference[i][j] value and at the same time it is also a reference layer of another layer that has the value of prepend_dependencies[i][j] equal to 1.
2. When a layer is a reference layer for two other layers in the same operation point that both has prepend_dependencies[i][j] equal to 1.

A second issue in the design in DAM3 for the HEVC operation point descriptor may be that, for an operation point, not all layers that are required to be decoded by video decoder 30 for the HEVC operation point need to be signaled explicitly because some layers (elementary streams) may depend on others and such information is present elsewhere (e.g., in hierarchy descriptor or hierarchy extension descriptor). When the value of the syntax element prepend_dependencies[i][j] is equal to 1, other layers on which the j-th layer depends may be derived and therefore not explicitly signaled for the i-th HEVC operation point. However, in the HEVC operation point, a derived layer is not present in the loop of the explicit layers (as indicated by the text between the tags "<EMPHASIS>" and </EMPHASIS>" in Table 2-103noniens above). Therefore, currently there is no way to know the values of the following syntax elements for a derived layer: output_layer_flag[i][j] and ptl_ref_idx[i][j], though the derived layer's elementary stream can be identified by the hierarchy descriptor and/or the hierarchy extension descriptor. In other words, when signaling layers of an operation point with references to elementary streams and several layers are not explicitly signaled but derived (when the value of syntax element prepend_dependencies[i][j] is 1), information such as whether a layer is an output layer and the profile, tier and level for those derived layers is missing for these derived layers.

An output operation point in layered HEVC is defined based on an output layer set. However, knowing whether a layer is an output layer may be required for conformance definition in layered HEVC and each necessary layer (i.e., a layer that is either an output layer or a layer that is referred to directly or indirectly by an output layer within an operation point or both) shall be associated with a set of profile, tier and level (PTL) information according to the MV-HEVC/SHVC specification. Therefore, it may be necessary to know whether or not a layer is a target output layer. For instance, it may be necessary to know the value of output_layer_flag[i][j] syntax element. However, the output_layer_flag[i][j] syntax element may also not be present in the bitstream for derived layers because the for-loop, enclosed in the tags "<EMPHASIS>" and "</EMPHASIS>" in Table 2-103noniens above, may only be applicable for explicitly signaled layers.

In addition, layered HEVC, by design, requires profile, tier and level information to be present for each necessary layer (i.e., a layer that is either a target output layer or needed for decoding a target output layer). The design of DAM3 is missing such information for the derived layers. Furthermore, for an unnecessary layer (i.e., a layer that is not a necessary layer), the PTL information is not signaled per the coding specification, and therefore in the Transport Stream carriage design always signaling PTL for unnecessary layers would be problematic as there is no PTL information for these layers to be signaled.

The following describes example techniques that may address the above issues. However, it should not be construed to be a requirement that the techniques described below address the above issues. The example techniques may be applied by video encoder 20, multiplexer 21, demultiplexer 29, an intermediate device (e.g., MANE), or another device as part of producing the bitstream that video decoder 30 eventually receives, or may be applied by video decoder 30 or another device as part of the decoding of video data for producing the images to be displayed. Some of the techniques may be applied independently and some of them may be applied in combination. Furthermore, although the disclosure describes HEVC operation point descriptors and otherwise refers to HEVC, the techniques of this disclosure may be applicable to video coding standards other than HEVC.

In accordance with a first technique of this disclosure, a flag is signaled for each elementary stream (ES)/layer in the HEVC operation point to indicate whether the ES/layer is a necessary layer or not. In this disclosure, references to ES/layer or layer/ES refer to an elementary stream corresponding to a layer or a temporal sub-layer of the layer. Hence, data identifying an elementary stream may be used to identify the corresponding layer, and vice versa. For example, video encoder 20, multiplexer 21, or an intermediate device may output (e.g., signal) a flag (e.g., necessary_layer_flag[i][k], described below) in the bitstream for each elementary stream or layer in the operation point indicating whether the elementary stream or layer is necessary or not. Video decoder 30 may receive such a flag and utilize the flag for decoding of the bitstream. In other words, video decoder 30 may decode the operation point based on the received flag.

In accordance with a second technique of this disclosure, the semantics of prepend_dependencies[i][j] are updated to clarify that the inclusion of an ES/layer into the list of elementary streams for an operation point will be applied only when the ES is not present yet in the list. For instance, semantics of prepend_dependencies[i][j] equal to 0 are added and it is clarified that a layer/elementary stream would be included into the list of elementary streams for target operation point only if the layer/elementary stream is not present yet in the list.

Thus, in some examples, a device, such as video encoder 20, generates a first descriptor, such as an operation point descriptor. Additionally, the device may generate a second descriptor, such as a hierarchy descriptor or a hierarchy extension descriptor. As part of generating the first descriptor, the device may include a first syntax element and a second syntax element in the first descriptor. In at least some such examples, an elementary stream list is a list of elementary streams that are part of the operation point and the second descriptor has a hierarchy layer index value equal to a value of the second syntax element. A first value of the first syntax element specifies that an elementary stream indicated by the second syntax element, when not present in the elementary stream list, shall be added into the elementary stream list, and an elementary stream indicated by an embedded layer index in the second descriptor, when not present in the elementary stream list, shall be added to the elementary stream list. A second value of the first syntax element specifies that the elementary stream indicated by the second syntax element, when not present in the elementary stream list, shall be added into the elementary stream list, but not the elementary stream indicated by the embedded layer index in the second descriptor. The device may include the first descriptor and the second descriptor in a transport stream.

In a similar example, a device, such as video decoder 30, receives a transport stream that includes a first descriptor, a second descriptor, and a plurality of elementary streams. The first descriptor may be a descriptor for an operation point of the video data. The second descriptor may be one of: a hierarchy descriptor or a hierarchy extension descriptor. The device may decode a first syntax element and a second syntax element in the first descriptor. In at least some such examples, an elementary stream list is a list of elementary streams of the transport stream that are part of the operation point and the second descriptor has a hierarchy layer index value equal to a value of the second syntax element. Furthermore, in such examples, a first value of the first syntax element specifies that: an elementary stream indicated by the second syntax element, when not present in the elementary stream list, shall be added into the elementary stream list, the elementary stream indicated by the second syntax element being one of the plurality of elementary streams, and an elementary stream indicated by an embedded layer index in the second descriptor, when not present in the elementary stream list, shall be added to the elementary stream list, the elementary stream indicated by the embedded layer index in the second descriptor being one of the plurality of elementary streams. In response to determining the first syntax element has a second value different from the first value, the device may add the elementary stream indicated by the second syntax element, when not present in the elementary stream list, into the elementary stream list, but not add the elementary stream indicated by the embedded layer index in the second descriptor into the elementary stream list.

In accordance with a third technique of this disclosure, a restriction is added to the value of ES_reference[i][j] such that the same elementary stream will not be explicitly signaled more than once for any particular operation point.

In other words, it is further suggested to impose a restriction that the same elementary stream shall not be explicitly signaled more than once for any particular operation point. For example, video encoder 20 or the intermediate device may be configured such that the same elementary stream will not be explicitly signaled more than once.

Furthermore, this disclosure describes several example techniques that solve the second issue described above (i.e., the problem of not being able to determine values of certain syntax elements for a derived layer, such as the problem of missing output layer flag and PTL information problem). In some such techniques for solving the second issue, it is proposed to keep the functionality of deriving layers for an operation point, signal the missing information for the derived layers, but not to signal PTL for unnecessary layers.

In a first example technique for solving the second issue, prepend_dependencies[i][j] syntax elements are removed and all layers are always explicitly signaled.

In a second example technique for solving the second issue, two loops for the layers of one operation point in the HEVC operation point descriptor are introduced. One loop contains the ES_reference[i][j] syntax elements and prepend_dependencies[i][j] syntax elements of the layers that are explicitly associated with the reference to an elementary stream (ES_reference[i][j]). Another loop contains the output_layer_flag[i][k] syntax elements and ptl_ref_idx[i][k] syntax elements of all the layers. Video encoder 20, multiplexer 21, demultiplexer 29, video decoder 30, an intermediate device, and/or another device may implement these example loops to encode or decode the HEVC operation point descriptor.

In one instance of the second example technique for solving the second issue, a device may be configured to perform a first loop to generate or decode multiple instances (e.g., sets) of a first syntax element (e.g., ES_reference[i][j]) in an HEVC operation point descriptor. The first syntax element indicates the hierarchy layer index value present in the hierarchy descriptor or HEVC_hierarchy_extension_descriptor which identifies an elementary stream of an operation point. In the first loop, the device also generates or decodes multiple instances of a second syntax element (e.g., prepend_dependencies[i][j]). The second syntax element indicates from which structures elementary streams are to be included in a list of elementary streams for the operation point, as part of the performance of the first loop. Furthermore, in this example, the device may perform a second loop to generate or decode multiple instances of a third syntax element (e.g., output_layer_flag[i][k]) that indicates which elementary stream of the operation point is an output layer. Additionally, in the second loop, the device may generate or decode multiple instances of a fourth syntax element (e.g., ptl_ref_idx[i][k]) that indicates an index for determining a profile, tier, or level of an elementary stream of the operation point. In some instances, the device may generate a transport stream including the HEVC operation point descriptor or decode the operation point based on one or more of the first, second, third, and fourth syntax elements.

In a third example technique for solving the second issue, the two loops in the above second example technique for solving the second issue may be merged together, with a flag for each layer indicating whether the layer is explicitly or implicitly signaled. For this example, it is assumed that the layers as derived by the hierarchy descriptor or hierarchy extension descriptor identified by ES_reference[i][j] formulate a certain order, so that it is possible for the layers as ordered in the second loop to map each of the explicitly signaled layers to the layers as signaled or derived by the information in the first loop.

A fourth example technique for solving the second issue still enables the functionality by the prepend_dependencies [i][j] syntax element, but when it applies, whether a derived layer is an output layer is inferred by a default value. For instance, when prepend_dependencies[i][j] is equal to 1, a device may infer that the value of an output_layer_flag[i][j] syntax element is equal to a default value. Such a default value, e.g., 0 or 1, may be signaled for the current operation point. The profile, tier and level of a derived layer is set to be the same of the same layer that has been previously explicitly signaled in a different operation point.

In order not to signal PTL for unnecessary layers, this disclosure proposes signaling a flag for each ES/layer in the HEVC operation point to indicate whether the ES/layer is a necessary layer or not. The signaling uses a bit that would otherwise be reserved, thus no additional overhead is introduced and the signaling avoids a complicated derivation process that may otherwise need to be specified. For example, a device (e.g., video encoder 20, multiplexer 21, demultiplexer 29, video decoder 30, an intermediate device, or another device) may be configured to determine elementary streams or layers of an operation point, determine a flag (e.g., necessary_layer_flag[i][k], described below) for each elementary stream or layer in the operation point, wherein the flag indicates whether a respective elementary stream or layer is a necessary stream or layer, and produces a bitstream that includes the elementary streams and respective flags.

Figure 2:
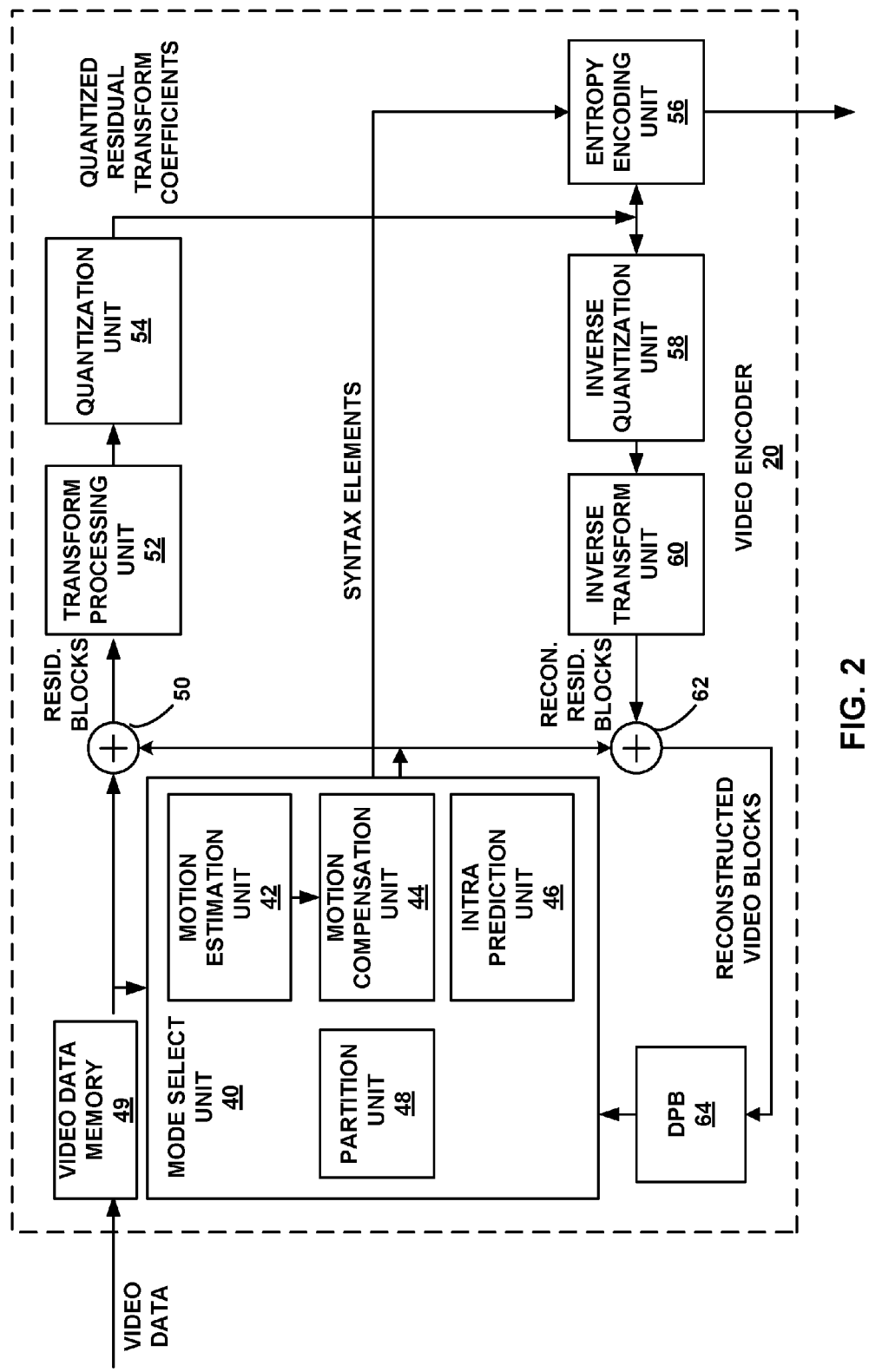
FIG. 2 is a block diagram illustrating an example of a video encoder that may implement techniques for transporting video data coded according to the extensions of the video coding standard.

FIG. 2 is a block diagram illustrating an example of video encoder 20 that may implement techniques for transporting video data coded according to extensions of a video coding standard. The video data may include multiple (e.g., two or more) enhancement layers to a base layer, where the enhancement layers may correspond to different scalability dimensions.

In the example of FIG. 2, video encoder 20 includes video data memory 49, mode select unit 40, decoded picture buffer (DPB) 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62.

Video data memory 49 may store video data to be encoded by the components of video encoder 20. The video data stored in video data memory 49 may be obtained, for example, from video source 18. DPB 64 may be a reference picture memory that stores reference video data for use in encoding video data by video encoder 20, e.g., in intra- or inter-coding modes. Video data memory 49 and DPB 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 49 and DPB 64 may be provided by the same memory device or separate memory devices. In various examples, video data memory 49 may be on-chip with other components of video encoder 20, or off-chip relative to those components.

During the encoding process, video encoder 20 receives a video frame or slice to be encoded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be encoded to provide spatial prediction. Video encoder 20 may perform multiple coding passes, e.g., to select an appropriate coding mode for each block of video data.

Moreover, partition unit 48 may partition blocks of video data into sub-blocks, e.g., based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and may provide the resulting intra- or inter-predicted block to summer 50 to generate residual block data and to summer 62 to reconstruct the encoded block for use in a reference frame. Mode select unit 40 also provides syntax elements, such as motion vectors, intra-mode indicators, partition information, and other such syntax information, to entropy encoding unit 56.

Motion estimation, performed by motion estimation unit 42, is the process of generating motion vectors, which estimate motion for video blocks. Motion estimation unit 42 may calculate a motion vector for a PU of a video block in an inter-coded slice by comparing the position of the PU to the position of a predictive block of a reference picture. The reference picture may be selected from a first reference picture list (RefPicList0) or a second reference picture list (RefPicList1), each of which identify one or more reference pictures stored in DPB 64. Motion estimation unit 42 sends the calculated motion vector to entropy encoding unit 56 and motion compensation unit 44. Motion compensation, performed by motion compensation unit 44, may involve fetching or generating the predictive block based on the motion vector determined by motion estimation unit 42. Summer 50 forms a residual video block by subtracting pixel values of the predictive block from the pixel values of the current video block being coded, forming pixel difference values, as discussed below. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode.

Video encoder 20 may form a residual video block by subtracting the prediction data from mode select unit 40 from the original video block being coded. Summer 50 represents the component or components that perform this subtraction operation. Transform processing unit 52 may apply a transform, such as a discrete cosine transform (DCT) or a conceptually similar transform, to the residual block, producing a video block comprising residual transform coefficient values. Quantization unit 54 may quantize the transform coefficients to further reduce bit rate. Following quantization, entropy encoding unit 56 may entropy encode syntax elements indicating the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of DPB 64. Summer 62 may add the reconstructed residual block to the motion compensated prediction block produced by motion compensation unit 44 to produce a reconstructed video block for storage in DPB 64. The reconstructed video block may be used by motion estimation unit 42 and motion compensation unit 44 as a reference block to inter-code a block in a subsequent video frame.

In some examples, video encoder 20 of FIG. 2 generates a first descriptor, such as an operation point descriptor. Additionally, video encoder 20 may generate a second descriptor, such as a hierarchy descriptor or a hierarchy extension descriptor. As part of generating the first descriptor, video encoder 20 may include a first syntax element and a second syntax element in the first descriptor. In at least some such examples, an elementary stream list is a list of elementary streams that are part of the operation point and the second descriptor has a hierarchy layer index value equal to a value of the second syntax element. A first value of the first syntax element specifies that an elementary stream indicated by the second syntax element, when not present in the elementary stream list, shall be added into the elementary stream list, and an elementary stream indicated by an embedded layer index in the second descriptor, when not present in the elementary stream list, shall be added to the elementary stream list. A second value of the first syntax element specifies that the elementary stream indicated by the second syntax element, when not present in the elementary stream list, shall be added into the elementary stream list, but not the elementary stream indicated by the embedded layer index in the second descriptor. Video encoder 20 may include the first descriptor and the second descriptor in a transport stream.

Figure 3:
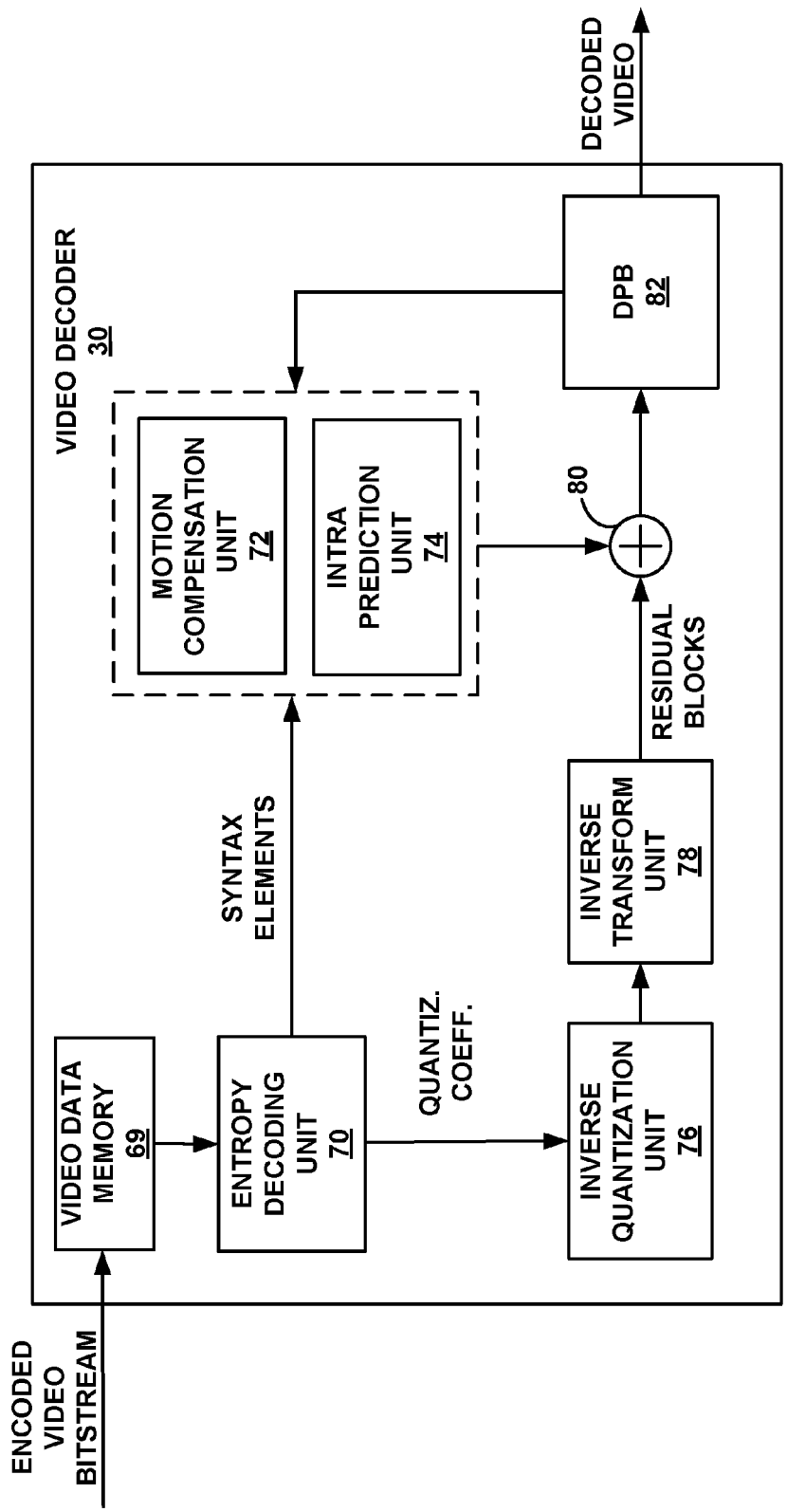
FIG. 3 is a block diagram illustrating an example of a video decoder that may implement techniques for transporting video data coded according to the extensions of the video coding standard.

FIG. 3 is a block diagram illustrating an example of video decoder 30 that may implement techniques for transporting video data coded according to extensions of a video coding standard. In the example of FIG. 3, video decoder 30 includes a video data memory 69, an entropy decoding unit 70, motion compensation unit 72, intra prediction unit 74, inverse quantization unit 76, inverse transformation unit 78, decoded picture buffer (DPB) 82 and summer 80.

Video data memory 69 may store encoded video data, such as an encoded video bitstream, to be decoded by the components of video decoder 30. The encoded video data stored in video data memory 69 may be obtained, for example, from computer-readable medium 16, e.g., from a local video source, such as a camera, via wired or wireless network communication of video data, or by accessing physical data storage media. Video data memory 69 may form a coded picture buffer (CPB) that stores encoded video data from an encoded video bitstream. DPB 82 may be a reference picture memory that stores reference video data for use in decoding video data by video decoder 30, e.g., in intra- or inter-coding modes. Video data memory 69 and DPB 82 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 69 and DPB 82 may be provided by the same memory device or separate memory devices. In various examples, video data memory 69 may be on-chip with other components of video decoder 30, or off-chip relative to those components.

Video data memory 69 may receive and store encoded video data (e.g., NAL units) of a bitstream. Entropy decoding unit 70 may receive encoded video data (e.g., NAL units) from video data memory 69 and may parse the NAL units to decode syntax elements. During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, intra-prediction mode indicators, and other syntax elements.

Intra prediction unit 74 may generate prediction data for a video block of the current video slice based on a signaled intra prediction mode and data from previously decoded blocks of the current frame or picture. Motion compensation unit 72 produces predictive blocks for a video block of the current video slice based on the motion vectors and other syntax elements received from entropy decoding unit 70. The predictive blocks may be produced from one of the reference pictures within one of the reference picture lists. Motion compensation unit 72 may determine prediction information for a video block using a prediction information, and may produce the predictive blocks for the current video block being decoded.

Inverse quantization unit 76 may inverse quantize the quantized transform coefficients provided in the bitstream and decoded by entropy decoding unit 70. Inverse transform unit 78 may apply an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 may form a decoded video block by summing the residual blocks from inverse transform unit 78 with the corresponding predictive blocks generated by motion compensation unit 72. Summer 80 represents the component or components that perform this summation operation. The decoded video blocks in a given frame or picture are then stored in DPB 82, which stores reference pictures used for subsequent motion compensation. DPB 82 also stores decoded video for later presentation on a display device, such as display device 32 of FIG. 1.

In some examples, video decoder 30 receives a transport stream that includes a first descriptor, a second descriptor, and a plurality of elementary streams. The first descriptor may be a descriptor for an operation point of the video data. The second descriptor may be one of: a hierarchy descriptor or a hierarchy extension descriptor. Video decoder 30 may decode a first syntax element and a second syntax element in the first descriptor. In at least some such examples, an elementary stream list is a list of elementary streams of the transport stream that are part of the operation point and the second descriptor has a hierarchy layer index value equal to a value of the second syntax element. Furthermore, in such examples, a first value of the first syntax element specifies that: an elementary stream indicated by the second syntax element, when not present in the elementary stream list, shall be added into the elementary stream list, the elementary stream indicated by the second syntax element being one of the plurality of elementary streams, and an elementary stream indicated by an embedded layer index in the second descriptor, when not present in the elementary stream list, shall be added to the elementary stream list, the elementary stream indicated by the embedded layer index in the second descriptor being one of the plurality of elementary streams. In response to determining the first syntax element has a second value different from the first value, video decoder 30 may add the elementary stream indicated by the second syntax element, when not present in the elementary stream list, into the elementary stream list, but not adding the elementary stream indicated by the embedded layer index in the second descriptor into the elementary stream list.

Figure 4:
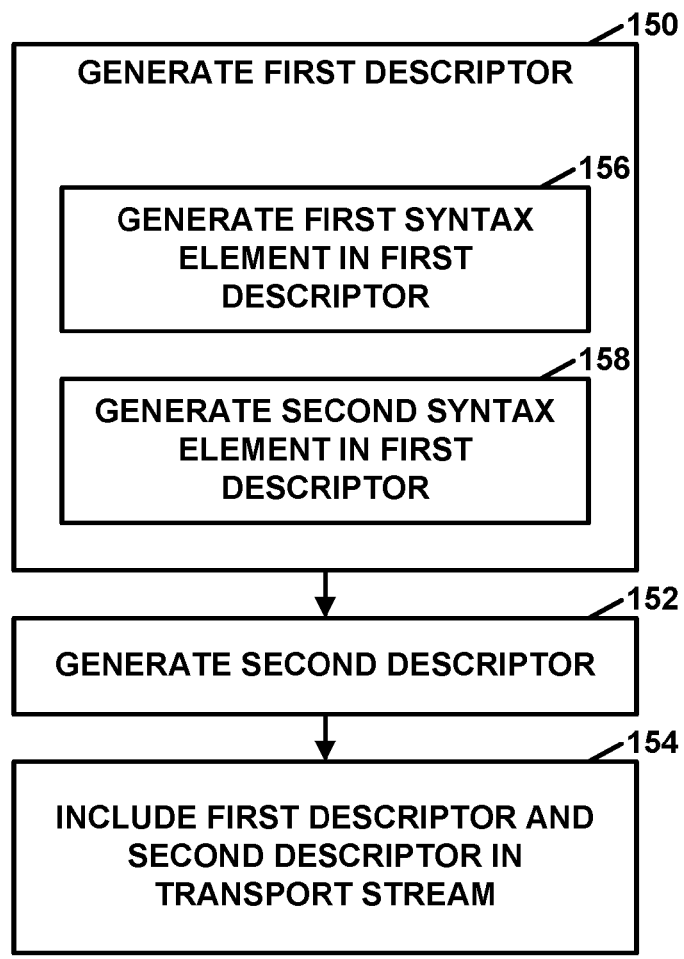
FIG. 4 is a flowchart illustrating an example operation of a device generating a transport stream, in accordance with a technique of this disclosure.

FIG. 4 is a flowchart illustrating an example operation of a device generating a transport stream, in accordance with a technique of this disclosure. The flowcharts of this disclosure are provided as examples of operations. Other operations in accordance with techniques of this disclosure may include more, fewer, or different actions, or may perform such actions in different orders or in parallel. In the example of FIG. 4, the device may be source device 12 or another type of device for processing video data. The operation of FIG. 4 may implement a solution to the second issue described above (i.e., the problem of not being able to determine values of certain syntax elements for a derived layer).

In the example of FIG. 4, the device generates a first descriptor (e.g., an HEVC operation point descriptor) (150). The first descriptor is a descriptor of an operation point. An elementary stream list (e.g., OperationPointESList[i]) is a list of elementary streams of the transport stream that are part of the operation point. A device receiving or processing a stream may generate the elementary stream list by adding elementary streams to the elementary stream list. Furthermore, the device generates a second descriptor (152). The second descriptor is one of: a hierarchy descriptor or a hierarchy extension descriptor. The device may include the first descriptor and the second descriptor in a transport stream (154). For instance, the device may output a series of bits representing the first descriptor and the second descriptor in the transport stream.

Furthermore, in the example of FIG. 4, as part of generating the first descriptor, the device includes a first syntax element (e.g., prepend_dependencies[i][j]) in the first descriptor (156). Additionally, as part of generating the first descriptor, the device includes a second syntax element (e.g., ES_reference[i][j]) in the second descriptor (158). The second descriptor has a hierarchy layer index value (e.g., hierarchy_layer_index) equal to a value of the second syntax element. When the device includes a syntax element in a descriptor, the device may store a value of the syntax element in a memory in a way that indicates the value is part of the descriptor, e.g., as part of a data structure.

In the example of FIG. 4, a first value (e.g., 1) of the first syntax element specifies that an elementary stream indicated by the second syntax element, when not present in the elementary stream list, shall be added into the elementary stream list. Additionally, the first value of the first syntax element specifies an elementary stream indicated by an embedded layer index (e.g., hierarchy_embedded_layer_index or hierarchy_ext_embedded_layer_index) in the second descriptor, when not present in the elementary stream list, shall be added to the elementary stream list. A second value of the first syntax element specifies that the elementary stream indicated by the second syntax element, when not present in the elementary stream list, shall be added into the elementary stream list, but not the elementary stream indicated by the embedded layer index in the second descriptor.

Figure 5:
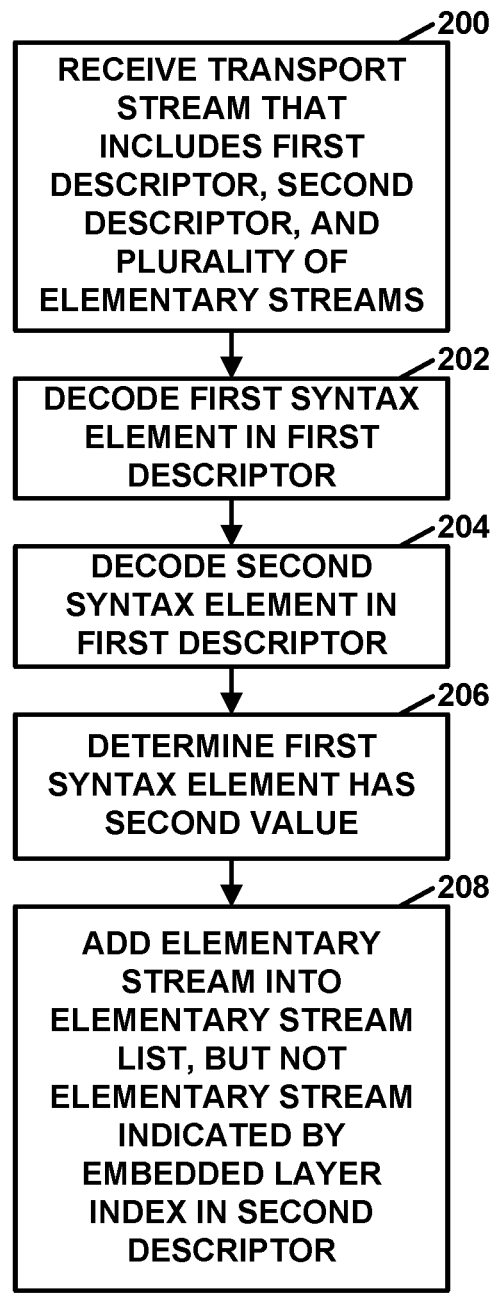
FIG. 5 is a flowchart illustrating an example operation of a device that receives a transport stream, in accordance with a technique of this disclosure.

FIG. 5 is a flowchart illustrating an example operation of a device that receives a transport stream, in accordance with a technique of this disclosure. In the example of FIG. 5, the device may be destination device 14, a MANE, or another type of device for processing video data. The operation of FIG. 5 may implement a solution to the second issue described above (i.e., the problem of not being able to determine values of certain syntax elements for a derived layer).

In the example of FIG. 5, the device receives a transport stream that includes a first descriptor (e.g., an HEVC operation point descriptor), a second descriptor, and a plurality of elementary streams (200). The first descriptor is a descriptor for an operation point. The second descriptor is one of: a hierarchy descriptor or a hierarchy extension descriptor. In some examples, input interface 28 receives the transport stream.

Furthermore, the device may decode a first syntax element (e.g., prepend_dependencies[i][j]) in the first descriptor (202). In other words, the device may determine a value of the first syntax element. Examples ways of decoding a syntax element may include parsing the syntax element from a series of bits, applying an entropy decoding algorithm, or otherwise deriving the value of the syntax element. Additionally, the device may decode a second, different syntax element (e.g., ES_reference[i][j]) in the first descriptor (204). In other words, the device may determine a value of the second syntax element, e.g., by parsing the second syntax element from bits of the first descriptor. An elementary stream list (e.g., OperationPointESList[i]) is a list of elementary streams of the transport stream that are part of the operation point. The second descriptor has a hierarchy layer index value (e.g., hierarchy_layer_index) equal to a value of the second syntax element.

In the example of FIG. 5, a first value (e.g., 1) of the first syntax element specifies that an elementary stream indicated by the second syntax element, when not present in the elementary stream list, shall be added into the elementary stream list. The elementary stream indicated by the second syntax element may be one of the plurality of elementary streams received by the device. Additionally, the first value of the first syntax element specifies an elementary stream indicated by an embedded layer index (e.g., hierarchy_embedded_layer_index or hierarchy_ext_embedded_layer_index) in the second descriptor, when not present in the elementary stream list, shall be added to the elementary stream list. The elementary stream indicated by the embedded layer index in the second descriptor may be one of the plurality of elementary streams received by the device. A second value (e.g., 0) of the first syntax element specifies that the elementary stream indicated by the second syntax element, when not present in the elementary stream list, shall be added into the elementary stream list, but not the elementary stream indicated by the embedded layer index in the second descriptor.

Thus, in some instances, such as in the example of FIG. 5, the device may determine the first syntax element has the second value (206). In response to determining the first syntax element has the second value, the device may add the elementary stream indicated by the second syntax element, when not present in the elementary stream list, into the elementary stream list, but does not add the elementary stream indicated by the embedded layer index in the second descriptor into the elementary stream list (208). For instance, a device may add an elementary stream to a list by storing a reference to the elementary stream in a location in memory in a way that indicates the elementary stream is in the list, such as adding the reference to the elementary stream to a linked list or array.

Although not illustrated in the example of FIG. 5, the device may discard data for layers that do not correspond to the operation point. For instance, the device may discard transport packets of elementary streams corresponding to the layers that do not correspond to the operation point. The device may forward the remaining data (e.g., transport packets of elementary streams corresponding to the layers of the operation point) to another device or a video decoder, such as video decoder 30.

The following text describes some example ways to implement the aspects described above. The implementation details are described in terms of changes to DAM3. In the text changes of these implementations, text enclosed by the tags "<ins>" and "</ins>" is added or modified (e.g., <ins>inserted or modified text</ins>), while removals are enclosed in the tags "<dlt>" and "</dlt>" (e.g., <dlt>deleted text</dlt>).

In accordance with a first example implementation technique, Table 1 and its syntax elements describe the detail modifications to DAM3 for the first, second, and third examples for solving the first issue described above and the second example for solving the second issue described above.

TABLE 1

| Syntax | No. Of bits | Mnemonic |
|---|---|---|
| HEVC_operation_point_descriptor( ) { | | |
|   <ins>reserved</ins> | <ins>2</ins> | <ins>bslbf</ins> |
|   num_ptl | <ins>6</ins> | uimsbf |
|   for ( i = 0; i < num_ptl; i++, i++ ) { | | |
|     profile_tier_level_info[i] | 96 | bslbf |
|   } | | |
|   operation_points_count | 8 | uimsbf |
|   for ( i = 0; i < operation_points_count; i++ ) { | | |
|     target_ols[i] | 8 | uimsbf |
|     ES_count[i] | 8 | uimsbf |
|     for ( j = 0; j < ES_count<ins>[i]</ins>; j++ ) { | | |
|       <dlt>output_layer_flag[i][j]</dlt> | <dlt>1</dlt> | <dlt>bslbf</dlt> |
|       prepend_dependencies[i][j] | 1 | bslbf |

TABLE 1-continued

| Syntax | No. Of bits | Mnemonic |
|---|---|---|
|     ES_reference[i][j] | 6 | uimsbf |
|     <ins>reserved[i][j]</ins> | <ins>1</ins> | bslbf |
|     <delete>ptl_ref_idx[i][j]</delete> | <dlt>8</dlt> | <dlt>uimsbf</dlt> |
|   } | | |
|   <ins>for ( k = 0; k < NumESinOP[i]; k++ )</ins> | | |
| { | | |
|     necessary_layer_flag[i][k] | <ins>1</ins> | <ins>bslbf</ins> |
|     output_layer_flag[i][k] | <ins>1</ins> | <ins>bslbf</ins> |
|     ptl_ref_idx[i][k]</ins> | <ins>6</ins> | <ins>uimsbf</ins> |
|   } | | |
|   reserved | 1 | bslbf |
|   avg_bit_rate_info_flag[i] | 1 | bslbf |
|   max_bit_rate_info_flag[i] | 1 | bslbf |
|   constant_frame_rate_info_idc[i] | 2 | uimsbf |
|   applicable_temporal_id[i] | 3 | uimsbf |
|   if ( constant_frame_rate_info_idc[i] > 0 ) { | | |
|     reserved | 4 | bslbf |
|     frame_rate_indicator[i] | 12 | uimsbf |
|   } | | |
|   if ( avg_bit_rate_info_flag[i] == '1' ) { | | |
|     avg_bit_rate[i] | 24 | uimsbf |
|   } | | |
|   if ( max_bit_rate_info_flag[i] == '1') { | | |
|     max_bit_rate[i] | 24 | uimsbf |
|   } | | |
|  } | | |
| } | | |

The following text indicates modifications to the semantics in accordance with the first example implementation technique.

num_ptl—This <dlt>8-bit</dlt> <ins>6-bit</ins> field specifies the number of profile, tier and level structures signaled in this descriptor. <ins>Let OperationPointESList [i] be the list of ESs that are part of the i-th HEVC operation point. </ins> prepend_dependencies[i][j]—This flag if set to 1 <dlt>indicates</dlt> <ins>specifies</ins> that the ES indicated by ES_reference[i][j], when not present yet in OperationPointESList[i], shall be added into OperationPointESList[i] and </ins> <dlt>that</dlt> the ES <ins>indicated</ins> by the syntax element hierarchy_embedded_layer_index in the hierarchy descriptor, or all of the ESs <ins>indicated</ins> by the syntax element hierarchy_ext_embedded_layer_index in the HEVC hierarchy extension descriptor, with the hierarchy layer index value specified by the following syntax element ES_reference[i][j]<ins>, when not present yet in OperationPointESList[i],</ins> shall be added <dlt>to the of elementary streams for the target operation point</dlt> <ins>into OperationPointLayerList[i] immediately</ins> before the ES signaled by the ES_reference[i][j] <ins>in ascending order of the value of their associated hierarchy_embedded_layer_index or hierarchy_ext_embedded_layer_index. When the value of prepend_dependencies [i][j] is equal to 0, only the ES indicated by ES_reference [i][j], when not present yet in OperationPointESList[i], shall be added into OperationPointESList[i]. The ES indicated by ES_reference [i][m] shall be placed earlier (i.e., with a lower index) into OperationPointESList[i] than the ES indicated with ES_reference[i][n] when m is less than n.</ins>

<ins>NOTE: The order of ES in the OperationPointESList [i] must be in ascending order of their hierarchy_layer_index values.</ins>

ES_reference[i][j]—This 6-bit field indicates the hierarchy layer index value present in the hierarchy descriptor or HEVC_hierarchy_extension_descriptor which identifies an elementary stream. <ins>The value of ES_reference[i][m] and ES_reference[i][n] for m not equal to n shall not be the same.</ins>

<ins>Let the NumESinOP[i] be the number of ESs in OperationPointESList[i] after all the ESs that are part of the i-th HEVC operation point have been included into OperationPointESList[i] (i.e., after parsing ES_reference N[ES_count[i]−1]).</ins>

<ins>necessary_layer_flag[i][k]—This flag when set to '1' indicates that the k-th ES in OperationPointESList[i] is a necessary layer, as defined in 23008-2, of the i-th operation point. This flag equal to '0' indicates that the k-th ES in OperationPointESList[i] is not a necessary layer, as defined in 23008-2, of the i-th operation point.</ins> output_layer_flag[i]<ins>[k]</ins>—This flag when set to '1' indicates that the <ins>k</ins>-th <ins>ES in OperationPointESList[i]</ins> <dlt>layer of the i-th HEVC operation point defined in this descriptor</dlt> is an output layer. Otherwise, when set to '0', it indicates that the <ins>k</ins>-th <ins>ES in OperationPointESList[i]</ins> <dlt>layer of the i-th HEVC operation point defined in this descriptor</dlt> is not an output layer. <ins>When the value of necessary_layer_flag[i][k] is equal to 0, the value of output_layer_flag[i][k] shall be ignored.</ins> ptl_ref_idx[i] [k]—<dlt>An 8-bit</dlt> <ins>A 6-bit</ins> field that indicates the index x to the profile_tier_level_info [x] element of the profile_tier_level_array which applies to the <ins>k</ins>-th <ins>ES in OperationPointESList[i]</ins> <dlt>layer of the i-th HEVC operation point defined in this descriptor</dlt>. <ins>When the value of necessary_layer_flag[i][k] is equal to 0, the value of ptl_ref_idx[i][k] shall be ignored.</ins>

Figure 6:
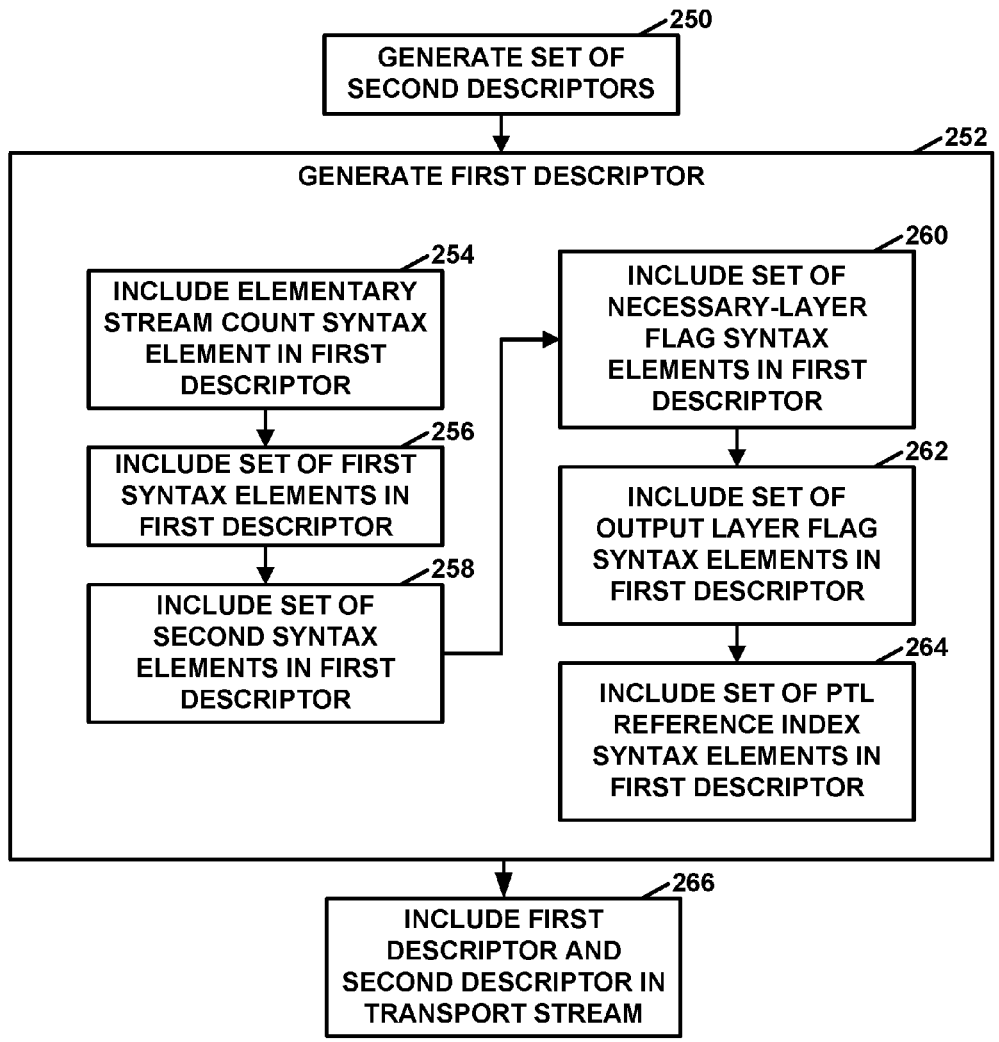
FIG. 6 is a flowchart illustrating an example operation of a device for generating a transport stream in accordance with an example technique of this disclosure.

FIG. 6 is a flowchart illustrating an example operation of a device for generating a transport stream in accordance with an example technique of this disclosure. For instance, the operation of FIG. 6 may be in accordance with the first example implementation technique of this disclosure discussed above (i.e, the technique described above with regard to Table 1). The operation of FIG. 6 may be performed by source device 12 or another device. The operation of FIG. 6 may be an expanded version of the operation of FIG. 4.

In the example of FIG. 6, the device may generate a set of second descriptors (250). Each respective second descriptor of the set of second descriptors may be one of: a hierarchy descriptor or a hierarchy extension descriptor. The set of second descriptors may include the "second descriptor" described with regard to FIG. 4.

Additionally, the device may generate a first descriptor (e.g., a HEVC operation point descriptor) (252). As part of generating the first descriptor, the device may include an elementary stream count syntax element (e.g., ES_count) in the first descriptor (254). The elementary stream count syntax element may indicate a number of elementary streams.

Furthermore, as part of generating the first descriptor, the device may include a set of first syntax elements (e.g., prepend_dependencies[i][j]) in the first descriptor (256). Additionally, as part of generating the first descriptor, the device may include a set of second syntax elements (e.g., ES_reference[i][j]) in the first descriptor (258). The number of first syntax elements in the set of first syntax elements and the number of second syntax elements in the set of second syntax elements is equal to a value of the elementary stream count syntax element. The set of first syntax elements may include the "first syntax element" referred to with regard to FIG. 4. The set of second syntax elements may include the "second syntax element" referred to with regard to FIG. 4.

In some examples, the set of second syntax elements is restricted such that no two second syntax elements of the set of second syntax elements have the same value. In other words, as indicated in the changes to DAM3 above, the value of ES_reference[i][m] and ES_reference[i][n] for m not equal to n shall not be the same.

For each respective first syntax element of the set of first syntax elements, a respective second syntax element of the set of second syntax elements corresponds to the respective first syntax element. For instance, a first syntax element and a second syntax element with the same values of i and j correspond to one another. A respective second descriptor of the set of second descriptors has a hierarchy layer index value (e.g., hierarchy_layer_id) equal to a value of the respective second syntax element.

In the example of FIG. 6, a first value (e.g., 1) of the respective first syntax element specifies that an elementary stream indicated by the respective second syntax element, when not present in the elementary stream list, shall be added into the elementary stream list, and an elementary stream indicated by an embedded layer index in the respective second descriptor, when not present in the elementary stream list of the operation point, shall be added to the elementary stream list. A second value (e.g., 0) of the respective first syntax element specifies that the respective elementary stream indicated by the respective second syntax element, when not present in the elementary stream list, shall be added into the elementary stream list, but not the respective elementary stream indicated by the embedded layer index in the respective second descriptor.

Furthermore, in the example of FIG. 6, the device may include a set of necessary-layer flag syntax elements (e.g., necessary_layer_flag[i][k]) in the first descriptor (260). Each respective syntax element in the set of necessary-layer flag syntax elements may correspond to a respective elementary stream in the elementary stream list. Each respective syntax element of the set of necessary-layer flag syntax elements indicates whether the elementary stream corresponding to the respective syntax element of the set of necessary-layer flag syntax elements is a necessary layer. A necessary layer may be defined as a layer in an output operation point associated with an output layer set, the layer being an output layer of the output layer set, or a reference layer of an output layer of the output layer set.

The device may also include a set of output layer flag syntax elements (e.g., output_layer_flag[i][k]) in the first descriptor (262). Each respective syntax element in the set of output syntax elements may correspond to a respective elementary stream in the elementary stream list. Each respective syntax element of the set of output layer flag syntax elements may indicate whether the elementary stream corresponding to the respective syntax element of the set of output layer flag syntax elements is an output layer.

Furthermore, the device may include a set of PTL reference index syntax elements (e.g., ptl_ref_idx[i][k]) in the first descriptor (264). Each respective syntax element in the set of PTL reference index syntax elements may correspond to a respective elementary stream in the elementary stream list. Each respective syntax element of the set of PTL reference index syntax elements may indicate an index for determining a profile, tier, or level of the elementary stream corresponding to the respective syntax element of the set of PTL reference index syntax elements.

In the example of FIG. 6, the device may include the first descriptor and the second descriptor in a transport stream (266). For instance, the device may generate a set of transport packets containing the first descriptor and the second descriptor. The transport stream may further include one or more elementary streams. In other examples, one or more actions of FIG. 6 may be omitted.

Figure 7:
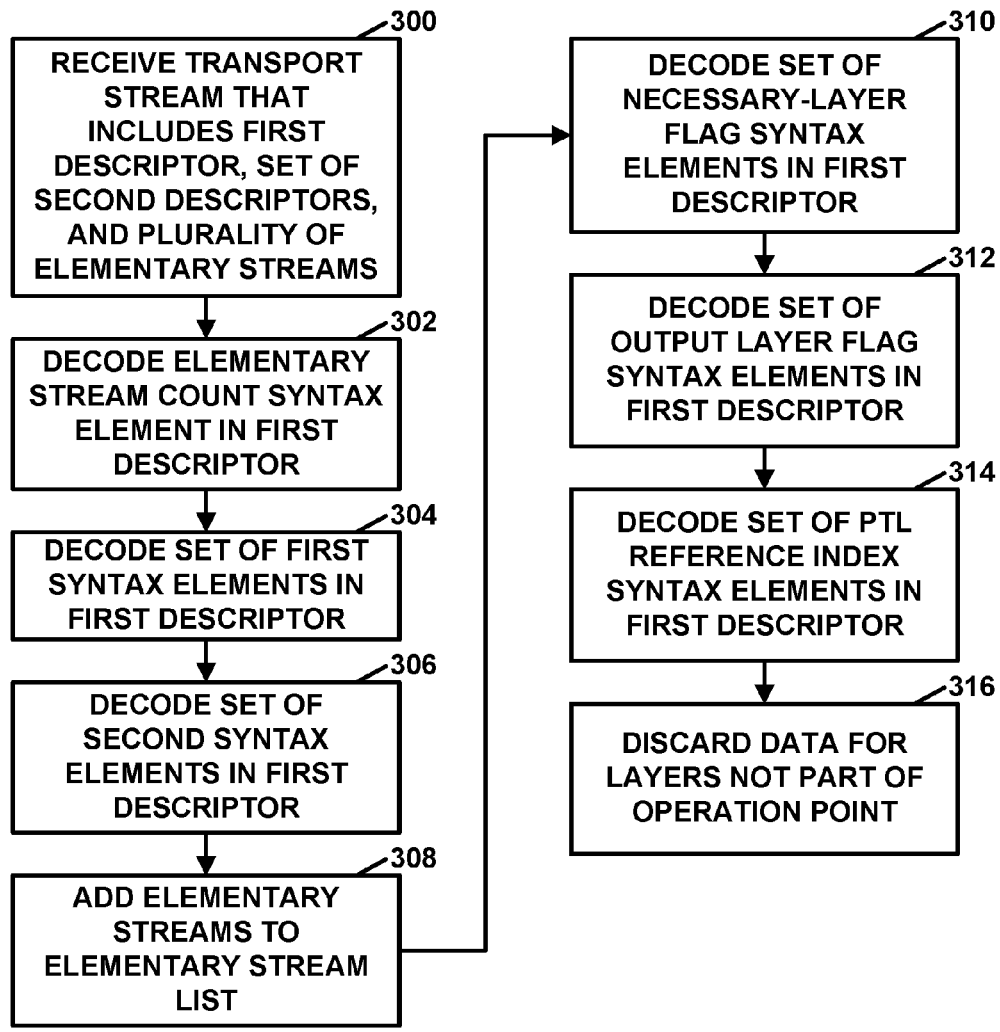
FIG. 7 is a flowchart illustrating an example operation of a device receives a transport stream in accordance with an example technique of this disclosure.

FIG. 7 is a flowchart illustrating an example operation of a device the receives a transport stream in accordance with an example technique of this disclosure. For instance, the operation of FIG. 7 may be consistent with the first example implementation technique discussed above. The operation of FIG. 7 may be an expanded version of the operation of FIG. 5.

In the example of FIG. 7, the device receives a transport stream that includes a first descriptor (e.g., a HEVC operation point descriptor), a set of second descriptors, and a plurality of elementary streams (300). The set of second descriptors may include the "second descriptor" mentioned above with regard to FIG. 5. Each respective second descriptor of the set of second descriptors may be one of: a hierarchy descriptor or a hierarchy extension descriptor.

Additionally, in the example of FIG. 7, the device may decode an elementary stream count syntax element (e.g., ES_count, which may be referred to in the claims as a "third syntax element") in the first descriptor. The elementary stream count syntax element indicates a number of elementary streams.

Furthermore, in the example of FIG. 7, the device may decode a set of first syntax elements (e.g., prepend_dependencies[i][j]) in the first descriptor (302). Furthermore, in the example of FIG. 7, the device may decode a set of second syntax elements (e.g., ES_reference[i][j]) in the first descriptor (304). The number of first syntax elements in the set of first syntax elements and the number of second syntax elements in the set of second syntax elements is equal to a value of the third syntax element. The set of first syntax elements may include the "first syntax element" mentioned with regard to FIG. 5. The set of second syntax elements may include the "second syntax element" mentioned with regard to FIG. 5.

In some examples, the set of second syntax elements is restricted such that no two second syntax elements of the set of second syntax elements have the same value. In other words, as indicated in the changes to DAM3 above, the value of ES_reference[i][m] and ES_reference J[n] for m not equal to n shall not be the same.

For each respective first syntax element of the set of first syntax elements a respective second syntax element of the set of second syntax elements corresponds to the respective first syntax element. For instance, a first syntax element and a second syntax element with the same values of i and j correspond to one another. A respective second descriptor of the set of second descriptors has a hierarchy layer index value (e.g., hierarchy_layer_id) equal to a value of the respective second syntax element.

In the example of FIG. 7, a first value (e.g., 1) of the respective first syntax element specifies that an elementary stream indicated by the respective second syntax element, when not present in the elementary stream list, shall be added into the elementary stream list, and an elementary stream indicated by an embedded layer index in the respective second descriptor, when not present in the elementary stream list of the operation point, shall be added to the elementary stream list. The elementary stream indicated by the respective second syntax element may be one of the plurality of elementary streams. A second value (e.g. 0) of the respective first syntax element specifies that the respective elementary stream indicated by the respective second syntax element, when not present in the elementary stream list, shall be added into the elementary stream list, but not the respective elementary stream indicated by the embedded layer index in the respective second descriptor. The elementary stream indicated by the embedded layer index in the respective second descriptor may be one of the plurality of elementary streams.

For each respective first syntax element of the set of first syntax elements, a set of one or more embedded layer indices is included in the respective second descriptor. Furthermore, in the example of FIG. 7, based on the respective first syntax element having the first value, the device may add, in ascending order of value of the set of embedded layer indices, elementary streams indicated by the set of embedded layer indices into the elementary stream list immediately before the elementary stream indicated by the respective second syntax element (308). In other words, in response to determining the respective first syntax element has the second value, the device may add the respective elementary stream indicated by the respective second syntax element, when not present in the elementary stream list, into the elementary stream list, but does not add the respective elementary stream indicated by the embedded layer index in the respective second descriptor into the elementary stream list.

In the example of FIG. 7, the device may decode a set of necessary-layer flag syntax elements (e.g., necessary_layer_flag[i][k]) in the first descriptor (310). Each respective syntax element in the set of necessary-layer flag syntax elements may correspond to a respective elementary stream in the elementary stream list. Each respective syntax element of the set of necessary-layer flag syntax elements may indicate whether the elementary stream corresponding to the respective syntax element of the set of necessary-layer flag syntax elements is a necessary layer. As described above, a necessary layer is defined as a layer in an output operation point associated with an output layer set, the layer being an output layer of the output layer set, or a reference layer of an output layer of the output layer set.

Furthermore, in the example of FIG. 7, the device may decode a set of output layer flag syntax elements (e.g., output_layer_flag[i][k]) in the first descriptor (312). Each respective syntax element in the set of output layer flag syntax elements may correspond to a respective elementary stream in the elementary stream list. Each respective syntax element of the set of output layer flag syntax elements indicates whether the elementary stream corresponding to the respective syntax element of the set of output layer flag syntax elements is an output layer.

Additionally, the device may decode a set of PTL reference index syntax elements in the first descriptor (314). Each respective syntax element in the set of PTL reference index syntax elements may correspond to a respective elementary stream in the elementary stream list. Each respective syntax element of the set of PTL reference index syntax elements may indicate an index for determining a profile, tier, or level of the elementary stream corresponding to the respective syntax element of the set of PTL reference index syntax elements.

In the example of FIG. 7, the device may discard data for layers that are not part of the operation point (316). In other words, the device may discard data for layers that do not correspond to the operation point. In other examples, one or more actions of FIG. 7 may be omitted.

In accordance with a second example implementation technique, Table 2 and its syntax elements describe the detail modifications to DAM3 for the third example technique for solving the second issue described above.

TABLE 2

| Syntax | No. Of bits | Mnemonic |
|---|---|---|
| HEVC_operation_point_descriptor( ) { | | |
|   <ins>reserved</ins> | <ins>2</ins> | <ins>bslbf</ins> |
|   num_ptl | <ins>6</ins> | uimsbf |
|   for ( i = 0; i < num_ptl; i++, i++ ) { | | |
|     profile_tier_level_info[i] | 96 | bslbf |
|   } | | |
|   operation_points_count | 8 | uimsbf |
|   for ( i = 0; i < operation_points_count; i++ ) { | | |
|     target_ols[i] | 8 | uimsbf |
|     ES_count[i] | 8 | uimsbf |
|     for ( j = 0; j < ES_count<ins>[i]</ins>; j++ ) { | | |
|       output_layer_flag[i][j] | 1 | bslbf |
|       <ins>ptl_ref_idx[i][j]</ins> | <ins>6</ins> | <ins>uimsbf</ins> |
|       es_present_flag[i][j] | <ins>1</ins> | bslbf |

TABLE 2-continued

| Syntax | No. Of bits | Mnemonic |
|---|---|---|
|     if (es_present_flag[i][j]) { | | |
|       reserved[i][j]</ins> | 1 | bslbf |
|       prepend_dependencies[i][j] | 1 | bslbf |
|       ES_reference[i][j] | 6 | uimsbf |
|     } | | |
|     <dlt>ptl_ref_idx[i][j]</dlt> | <dlt>8</dlt> | <dlt>uimsbf</dlt> |
|   } | | |
|   reserved | 1 | bslbf |
|   avg_bit_rate_info_flag[i] | 1 | bslbf |
|   max_bit_rate_info_flag[i] | 1 | bslbf |
|   constant_frame_rate_info_idc[i] | 2 | uimsbf |
|   applicable_temporal_id[i] | 3 | uimsbf |
|   if ( constant_frame_rate_info_idc[i] > 0 ) { | | |
|     reserved | 4 | bslbf |
|     frame_rate_indicator[i] | 12 | uimsbf |
|   } | | |
|   if ( avg_bit_rate_info_flag[i] == '1' ) { | | |
|     avg_bit_rate [i] | 24 | uimsbf |
|   } | | |
|   if ( max_bit_rate_info_flag[i] == '1' ) { | | |
|     max_bit_rate[i] | 24 | uimsbf |
|   } | | |
| } | | |
| } | | |

The following text indicates modifications to the semantics in accordance with the second example implementation technique.

<ins>es_present_flag[i][j] specifies whether the ES_reference[i][j] and prepend_dependencies[i][j] are present for the j-th layer of the i-th operation point. When es_present_flag [i][j] is equal to 0, the value of ES_reference[i][j] is derived based on information in hierarchy descriptor or hierarchy extension descriptor of the previously signaled layer in the i-th operation point with the values of es_present_flag equal to 1 and values of prepend_dependencies equal to 1. When es_present_flag[i][j] is equal to 0, the value of prepend_dependencies[i][j] is derived to be 0. The value of es_present_flag[i][0] shall not be equal to 0.</ins> prepend_dependencies[i][j]—This flag if set to 1 indicates that the ES signaled by the syntax element hierarchy_embedded_layer_index in the hierarchy descriptor, or all of the ESs signaled by the syntax element hierarchy_ext_embedded_layer_index in the HEVC hierarchy extension descriptor, with the hierarchy layer index value specified by the following syntax element ES_reference[i][j] shall be added to the list of elementary streams for the target operation point <dlt>before</dlt> <ins>after</ins> the ES signaled by the ES_reference [i][j].

<ins>NOTE: The after list of elementary streams for the target operation point is populated, it shall be reorder in the ascending order of their hierarchy_layer_index value.</ins> Note that the solutions for problems of necessary layer and the possibility of duplicate inclusion of ES into the list of ESs for an HEVC operation can be applied to this alternative as well.

In accordance with a third example implementation technique, Table 3 and its syntax elements describe the detail modifications to DAM3 for the fourth example technique for solving the second issue described above.

TABLE 3

| Syntax | No. Of bits | Mnemonic |
|---|---|---|
| HEVC_operation_point_descriptor( ) { | | |
|   num_ptl | 8 | uimsbf |
|   for ( i = 0; i < num_ptl; i++, i++ ) { | | |
|     profile_tier_level_info[i] | 96 | bslbf |
|   } | | |
|   operation_points_count | 8 | uimsbf |
|   for ( i = 0; i < operation_points_count; i++ ) | | |
|   { | | |
|     target_ols[i] | 8 | uimsbf |
|     <ins>reserved[i]</ins> | <ins>1</ins> | <ins>bslbf</ins> |
|     ES_count[i] | <ins>6</ins> | uimsbf |
|     <ins>default_output_ref_layer[i] </ins> | <ins>1</ins> | <ins>bslbf</ins> |
|     for ( j = 0; j < ES_count; j++ ) { | | |
|       output_layer_flag[i][j] | 1 | bslbf |
|       prepend_dependencies[i][j] | 1 | bslbf |
|       ES_reference[i][j] | 6 | uimsbf |
|       ptl_ref_idx[i][j] | 8 | uimsbf |
|     } | | |
|     reserved | 1 | bslbf |
|     avg_bit_rate_info_flag[i] | 1 | bslbf |

TABLE 3-continued

| Syntax | No. Of bits | Mnemonic |
| --- | --- | --- |
|     max_bit_rate_info_flag[i] | 1 | bslbf |
|     constant_frame_rate_info_idc[i] | 2 | uimsbf |
|     applicable_temporal_id[i] | 3 | uimsbf |
|     if ( constant_frame_rate_info_idc[i] > 0 ) { | | |
|       reserved | 4 | bslbf |
|       frame_rate_indicator[i] | 12 | uimsbf |
|     } | | |
|     if ( avg_bit_rate_info_flag[i] == '1' ) { | | |
|       avg_bit_rate[i] | 24 | uimsbf |
|     } | | |
|     if ( max_bit_rate_info_flag[i] == '1' ) { | | |
|       max_bit_rate[i] | 24 | uimsbf |
|     } | | |
|   } | | |
| } | | |

The following text indicates modifications to the semantics in accordance with the third example implementation technique.

prepend_dependencies[i][j]—This flag if set to 1 indicates that the ES signaled by the syntax element hierarchy_embedded_layer_index in the hierarchy descriptor, or all of the ESs signaled by the syntax element hierarchy_ext_embedded_layer_index in the HEVC hierarchy extension descriptor, with the hierarchy layer index value specified by the following syntax element ES_reference[i][j] shall be added to the list of elementary streams for the target operation point before the ES signaled by the ES_reference[i][j] <ins>When prepend_dependencies[i][j] is equal to 1, for each elementary stream esA that is signaled by the syntax element hierarchy_embedded_layer_index in the hierarchy descriptor, or all of the elementary streams signaled by the syntax element hierarchy_ext_embedded_layer_index in the HEVC hierarchy extension descriptor, with the hierarchy layer index value specified by the following syntax element ES_reference[i][j], the following apply:
- If default_output_ref_layer[i] is equal to 0, the layer associated with esA is not an output layer of the i-th HEVC operation point; otherwise, the layer associated with esA is an output layer of the i-th HEVC operation point.
- There shall be at least one HEVC operation point opX with index between 0 to i–1 that also contained esA. If there are more than one candidates for opX, the one with the highest index shall be used. The index of the profile_tier_level_info[x] element of the profile_tier_level_array which applies to esA in the i-th HEVC operation point is the set equal to the index of the profile_tier_level_info[x] element of the profile_tier_level_array which applies to esA in opX.</ins>

Furthermore, to avoid unnecessary complication, prepend_dependencies may be signaled in the operation point level, rather than the layer level. The solutions for problems of necessary layer and the possibility of duplicate inclusion of ES into the list of ESs for an HEVC operation can be applied to this alternative as well.

prepend_dependencies[i]—This flag if set to 1 indicates that the ES signaled by the syntax element hierarchy_embedded_layer_index in the hierarchy descriptor, or all of the ESs signaled by the syntax element hierarchy_ext_embedded_layer_index in the HEVC hierarchy extension descriptor, with the hierarchy layer index value specified by the following syntax element ES_reference [i][j] shall be added to the list of elementary streams for the target operation point before the ES signaled by the ES_reference[i][j] <ins>for each elementary stream indicated by ES_reference [i][j] of the i-th operation point.</ins>

<ins>When prepend_dependencies[i] is equal to 1, for each elementary stream esA that is signaled by the syntax element hierarchy_embedded_layer_index in the hierarchy descriptor, or all of the elementary streams signaled by the syntax element hierarchy_ext_embedded_layer_index in the HEVC hierarchy extension descriptor, with the hierarchy layer index value specified by the following syntax element ES_reference[i][j], the following apply:
- If default_output_ref_layer[i] is equal to 0, the layer associated with esA is not an output layer of the i-th HEVC operation point; otherwise, the layer associated with esA is an output layer of the i-th HEVC operation point.
- There shall be at least one HEVC operation point opX with index between 0 to i–1 that also contained esA. If there are more than one candidates for opX, the one with the highest index shall be used. The index of the profile_tier_level_info[x] element of the profile_tier_level_array which applies to esA in the i-th HEVC operation point is the set equal to the index of the profile_tier_level_info[x] element of the profile_tier_level_array which applies to esA in opX.</ins>

In addition to the issue in DAM3 described above, when a layered HEVC bitstream contains one or more auxiliary layers, there is no mechanism to describe auxiliary enhancement in either hierarchy descriptor or hierarchy extension descriptor. An auxiliary picture is a picture that has no normative effect on the decoding process of primary pictures, and with a nuh_layer_id value such that AuxId[nuh_layer_id] is greater than 0. An auxiliary layer is a layer that contains auxiliary pictures. To solve this problem, it is suggested to include description for auxiliary hierarchy type in Table 2-50 and auxiliary enhancement in Table 2-103.

For the handling of auxiliary layers, layered HEVC supports the presence of auxiliary layers in the bitstream. An auxiliary layer may contain, for example, alpha channel or depth representation. The current text of ISO/IEC 13818-1: 201x/DAM 3 Carriage of Layered HEVC does not have the mechanism to describe auxiliary layers. Carrying SHVC/MV-HEVC auxiliary layers in an elementary stream with a specific stream type (e.g., 0x1E i.e., Auxiliary video stream as defined in ISO/IEC 23002-3) is not a sufficient solution because there is still no way to describe the hierarchy of this elementary stream and other elementary streams, especially the stream with which the auxiliary layer is associated in a program. In addition, the current L-HEVC buffer model does not handle stream types other than 0x27~0x2A, thus this solution (using a specific stream type) may require further modification to the buffer model.

To overcome the above problem, the disclosure describes inclusion of auxiliary hierarchy type in Table 2-50 and inclusion of auxiliary enhancement in Table 2-103undeciens, below. With this modifications, there is no further need to assign a specific stream type for auxiliary layers, no further need to update the buffer mode, and an auxiliary layer can be carried in an elementary stream with a stream type in the range of 0x27~0x2A.

The proposed text change to Table 2-50 is as follows:
Replace in Table 2-50 the description for values 8<ins>, 10>/ins> and 15 as follows:

TABLE 2-50

Hierarchy_type field values

| Value | Description |
| --- | --- |
| 8 | Combined Scalability or MV-HEVC sub-partition |
| <ins>10</ins> | <ins>Auxiliary</ins> |
| 15 | Base layer or MVC base view sub-bitstream or AVC video sub-bitstream of MVC or HEVC temporal video sub-bitstream or HEVC base sub-partition. |

Proposed text change to Table 2-103undeciens:

TABLE 2-103 undeciens - Semantics of extension dimension bits

| Index to bits | Description |
| --- | --- |
| 0 | Multi-view enhancement |
| 1 | Spatial scalability, including SNR |
| 2 | Depth enhancement |
| 3 | Temporal enhancement |
| <ins>4</ins> | <ins>Auxiliary enhancement</ins> |
| 5~15 | Reserved |

The following paragraphs provide additional examples of this disclosure.

In some examples, video decoder 30 may be configured to receive a first syntax element (e.g., prepend_dependencies[i][j]) for an operation point, wherein a first value of the syntax element specifies that an elementary stream indicated by a second syntax element (e.g., ES_reference[i][j]), when not present yet in an operation point list (e.g., OperationPointESList[i]), shall be added into the operation point list, and wherein a second value of the syntax element specifies that only the elementary stream indicated by the second syntax element, when not present yet in the operation list, shall be added into the operation point list, and decode the operation point based on the received first syntax element.

In some examples, video decoder 30 may be configured to perform a first loop to decode multiple instances of a first syntax element (e.g., ES_reference[i][j]) that indicates the hierarchy layer index value present in the hierarchy descriptor or HEVC hierarchy extension descriptor which identifies an elementary stream of an operation point, and/or decode multiple instances of a second syntax element (e.g., prepend_dependencies[i][j]) that indicates from which structures elementary streams are to be included in a list of elementary streams for the operation point, as part of the performance of the first loop, performing a second loop to decode multiple instances of a third syntax element (e.g., output_layer_flag[i][k]) that indicates which elementary stream of the operation point is an output layer and/or decode multiple instances of a fourth syntax element (e.g., ptl_ref_idx[i][k]) that indicates an index for determining an profile, tier, or level of an elementary stream of the operation point, and decode the operation point based on one or more of the first, second, third, and fourth syntax elements.

In some examples, video encoder 20 or an intermediate device (e.g., a MANE) may be configured to implement the example techniques described in this disclosure. For example, video encoder 20 or the intermediate device (or a combination of the two) may be configured to determine elementary streams or layers of an operation point, determine a flag (e.g., necessary_layer_flag[i][k], described below) for each elementary stream or layer in the operation point, wherein the flag indicates whether a respective elementary stream or layer is a necessary stream or layer, and produces a bitstream that includes the elementary streams and respective flags.

In one example, video encoder 20 or the intermediate device (or a combination of the two) may be configured to determine a first syntax element (e.g., prepend_dependencies[i][j]) for an operation point, wherein a first value of the syntax element specifies that an elementary stream indicated by a second syntax element (e.g., ES_reference[i][j]), when not present yet in an operation point list (e.g., OperationPointESList[i]), shall be added into the operation point list, and wherein a second value of the syntax element specifies that only the elementary stream indicated by the second syntax element, when not present yet in the operation list, shall be added into the operation point list, and produce a bitstream that includes information of the operation point including the determined first syntax element.

In one example, video encoder 20 or the intermediate device (or a combination of the two) may be configured to perform a first loop to determine multiple instances of a first syntax element (e.g., ES_reference[i][j]) that indicates the hierarchy layer index value present in the hierarchy descriptor or HEVC hierarchy extension descriptor which identifies an elementary stream of an operation point, and/or determine multiple instances of a second syntax element (e.g., prepend_dependencies[i][j]) that indicates from which structures elementary streams are to be included in a list of elementary streams for the operation point, as part of the performance of the first loop, performing a second loop to determine multiple instances of a third syntax element (e.g., output_layer_flag[i][k]) that indicates which elementary stream of the operation point is an output layer and/or determine multiple instances of a fourth syntax element (e.g., ptl_ref_idx[i][k]) that indicates an index for determining an profile, tier, or level of an elementary stream of the operation point, and produce a bitstream that includes one or more of the first, second, third, and fourth syntax elements for the operation point.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:
   receiving a transport stream that includes a first descriptor, a second descriptor, and a plurality of elementary streams, the first descriptor being a descriptor for an operation point of the video data, the second descriptor being one of: a hierarchy descriptor or a hierarchy extension descriptor;
   decoding a first syntax element and a second syntax element in the first descriptor, wherein:
      an elementary stream list is a list of elementary streams of the transport stream that are part of the operation point,
      the second descriptor has a hierarchy layer index value equal to a value of the second syntax element,
      a first value of the first syntax element specifies that:
         an elementary stream indicated by the second syntax element, when not present in the elementary stream list, shall be added into the elementary stream list, the elementary stream indicated by the second syntax element being one of the plurality of elementary streams, and
         an elementary stream indicated by an embedded layer index in the second descriptor, when not present in the elementary stream list, shall be added to the elementary stream list, the elementary stream indicated by the embedded layer index in the second descriptor being one of the plurality of elementary streams, and
   in response to determining the first syntax element has a second value different from the first value, adding the elementary stream indicated by the second syntax element, when not present in the elementary stream list, into the elementary stream list, but not adding the elementary stream indicated by the embedded layer index in the second descriptor into the elementary stream list.

2. The method of claim 1, further comprising:
   receiving a set of second descriptors in the transport stream, the set of second descriptors including the second descriptor, each respective second descriptor of the set of second descriptors being one of: a hierarchy descriptor or a hierarchy extension descriptor;
   decoding a third syntax element in the first descriptor, the third syntax element indicating a number of elementary streams;
   decoding a set of first syntax elements in the first descriptor; and
   decoding a set of second syntax elements in the first descriptor, wherein:
      the number of first syntax elements in the set of first syntax elements and the number of second syntax elements in the set of second syntax elements is equal to a value of the third syntax element,
      the set of first syntax elements includes the first syntax element,
      the set of second syntax elements includes the second syntax element,
      for each respective first syntax element of the set of first syntax elements:

a respective second syntax element of the set of second syntax elements corresponds to the respective first syntax element, a respective second descriptor of the set of second descriptors has a hierarchy layer index value equal to a value of the respective second syntax element, the first value of the respective first syntax element specifies that:

an elementary stream indicated by the respective second syntax element, when not present in the elementary stream list, shall be added into the elementary stream list, the elementary stream indicated by the respective second syntax element being one of the plurality of elementary streams, and an elementary stream indicated by an embedded layer index in the respective second descriptor, when not present in the elementary stream list of the operation point, shall be added to the elementary stream list, the elementary stream indicated by the embedded layer index in the respective second descriptor being one of the plurality of elementary streams, and in response to determining the respective first syntax element has the second value, adding the respective elementary stream indicated by the respective second syntax element, when not present in the elementary stream list, into the elementary stream list, but not adding the respective elementary stream indicated by the embedded layer index in the respective second descriptor into the elementary stream list.

3. The method of claim 2, further comprising:
for each respective first syntax element of the set of first syntax elements:
a set of one or more embedded layer indices is included in the respective second descriptor, and
based on the respective first syntax element having the first value, adding, in ascending order of value of the set of embedded layer indices, elementary streams indicated by the set of embedded layer indices into the elementary stream list immediately before the elementary stream indicated by the respective second syntax element.

4. The method of claim 1, further comprising:
decoding a set of syntax elements in the first descriptor, each respective syntax element in the set of syntax elements corresponding to a respective elementary stream in the elementary stream list, each respective syntax element of the set of syntax elements indicating whether the elementary stream corresponding to the respective syntax element of the set of syntax elements is a necessary layer,
wherein a necessary layer is defined as a layer in an output operation point associated with an output layer set, the layer being an output layer of the output layer set, or a reference layer of an output layer of the output layer set.

5. The method of claim 1, further comprising:
decoding a first set of syntax elements in the first descriptor, each respective syntax element in the first set of syntax elements corresponding to a respective elementary stream in the elementary stream list, each respective syntax element of the first set of syntax elements indicating whether the elementary stream corresponding to the respective syntax element of the first set of syntax elements is an output layer; and decoding a second set of syntax elements in the first descriptor, each respective syntax element in the second set of syntax elements corresponding to a respective elementary stream in the elementary stream list, each respective syntax element of the second set of syntax elements indicating an index for determining a profile, tier, or level of the elementary stream corresponding to the respective syntax element of the second set of syntax elements.

6. The method of claim 1, further comprising:
receiving a set of second descriptors in the transport stream, the set of second descriptors including the second descriptor, each respective second descriptor of the set of second descriptors being one of: a hierarchy descriptor or a hierarchy extension descriptor; and
decoding a set of second syntax elements in the first descriptor, wherein:
the set of second syntax elements includes the second syntax element,
each respective second syntax element of the set of second syntax elements indicating a hierarchy layer index value present in a descriptor of the set of second descriptors, and
the set of second syntax elements is restricted such that no two second syntax elements of the set of second syntax elements have the same value.

7. The method of claim 1, further comprising discarding data for layers that are not part of the operation point.

8. A device for processing video data, the device comprising:
an input interface configured to receive information including a transport stream that includes a first descriptor, a second descriptor, and a plurality of elementary streams, the first descriptor being a descriptor for an operation point of the video data, the second descriptor being one of: a hierarchy descriptor or a hierarchy extension descriptor; and
one or more processors configured to:
decode a first syntax element and a second syntax element in the first descriptor, wherein:
an elementary stream list is a list of elementary streams of the transport stream that are part of the operation point,
the second descriptor has a hierarchy layer index value equal to a value of the second syntax element,
a first value of the first syntax element specifies that:
an elementary stream indicated by the second syntax element, when not present in the elementary stream list, shall be added into the elementary stream list, the elementary stream indicated by the second syntax element being one of the plurality of elementary streams, and
an elementary stream indicated by an embedded layer index in the second descriptor, when not present in the elementary stream list, shall be added to the elementary stream list, the elementary stream indicated by the embedded layer index in the second descriptor being one of the plurality of elementary streams, and
in response to determining the first syntax element has a second value different from the first value, add the elementary stream indicated by the second syntax element, when not present in the elementary stream list, into the elementary stream list, but not add the elementary stream indicated by the embedded layer index in the second descriptor into the elementary stream list.

9. The device of claim 8, wherein the one or more processors are configured to:
receive a set of second descriptors in the transport stream, the set of second descriptors including the second descriptor, each respective second descriptor of the set of second descriptors being one of: a hierarchy descriptor or a hierarchy extension descriptor;
decode a third syntax element in the first descriptor, the third syntax element indicating a number of elementary streams;
decode a set of first syntax elements in the first descriptor; and
decode a set of second syntax elements in the first descriptor, wherein:
the number of first syntax elements in the set of first syntax elements and the number of second syntax elements in the set of second syntax elements is equal to a value of the third syntax element,
the set of first syntax elements includes the first syntax element,
the set of second syntax elements includes the second syntax element,
for each respective first syntax element of the set of first syntax elements:
a respective second syntax element of the set of second syntax elements corresponds to the respective first syntax element,
a respective second descriptor of the set of second descriptors has a hierarchy layer index value equal to a value of the respective second syntax element,
the first value of the respective first syntax element specifies that:
an elementary stream indicated by the respective second syntax element, when not present in the elementary stream list, shall be added into the elementary stream list, the elementary stream indicated by the respective second syntax element being one of the plurality of elementary streams, and
an elementary stream indicated by an embedded layer index in the respective second descriptor, when not present in the elementary stream list of the operation point, shall be added to the elementary stream list, the elementary stream indicated by the embedded layer index in the respective second descriptor being one of the plurality of elementary streams, and
in response to determining the respective first syntax element has the second value, the one or more processors are configured to add the respective elementary stream indicated by the respective second syntax element, when not present in the elementary stream list, into the elementary stream list, but not add the respective elementary stream indicated by the embedded layer index in the respective second descriptor into the elementary stream list.

10. The device of claim 9, wherein, for each respective first syntax element of the set of first syntax elements, a set of one or more embedded layer indices is included in the respective second descriptor, and the one or more processors are configured such that, based on the respective first syntax element having the first value, the one or more processors add, in ascending order of value of the set of embedded layer indices, elementary streams indicated by the set of embedded layer indices into the elementary stream list immediately before the elementary stream indicated by the respective second syntax element.

11. The device of claim 8, wherein the one or more processors are configured to:
decode a set of syntax elements in the first descriptor, each respective syntax element in the set of syntax elements corresponding to a respective elementary stream in the elementary stream list, each respective syntax element of the set of syntax elements indicating whether the elementary stream corresponding to the respective syntax element of the set of syntax elements is a necessary layer,
wherein a necessary layer is defined as a layer in an output operation point associated with an output layer set, the layer being an output layer of the output layer set, or a reference layer of an output layer of the output layer set.

12. The device of claim 8, wherein the one or more processors are configured to:
decode a first set of syntax elements in the first descriptor, each respective syntax element in the first set of syntax elements corresponding to a respective elementary stream in the elementary stream list, each respective syntax element of the first set of syntax elements indicating whether the elementary stream corresponding to the respective syntax element of the first set of syntax elements is an output layer; and
decode a second set of syntax elements in the first descriptor, each respective syntax element in the second set of syntax elements corresponding to a respective elementary stream in the elementary stream list, each respective syntax element of the second set of syntax elements indicating an index for determining a profile, tier, or level of the elementary stream corresponding to the respective syntax element of the second set of syntax elements.

13. The device of claim 8, wherein the one or more processors are configured to:
receive a set of second descriptors in the transport stream, the set of second descriptors including the second descriptor, each respective second descriptor of the set of second descriptors being one of: a hierarchy descriptor or a hierarchy extension descriptor; and
decode a set of second syntax elements in the first descriptor, wherein:
the set of second syntax elements includes the second syntax element,
each respective second syntax element of the set of second syntax elements indicating a hierarchy layer index value present in a descriptor of the set of second descriptors, and
the set of second syntax elements is restricted such that no two second syntax elements of the set of second syntax elements have the same value.

14. The device of claim 8, wherein the one or more processors are further configured to discard data for layers that are not part of the operation point.

15. A device for processing video data, the device comprising:
means for receiving a transport stream that includes a first descriptor, a second descriptor, and a plurality of elementary streams, the first descriptor being a descriptor for an operation point of the video data, the second descriptor being one of: a hierarchy descriptor or a hierarchy extension descriptor;

means for decoding a first syntax element and a second syntax element in the first descriptor, wherein:
an elementary stream list is a list of elementary streams of the transport stream that are part of the operation point,
the second descriptor has a hierarchy layer index value equal to a value of the second syntax element,
a first value of the first syntax element specifies that:
an elementary stream indicated by the second syntax element, when not present in the elementary stream list, shall be added into the elementary stream list, the elementary stream indicated by the second syntax element being one of the plurality of elementary streams, and
an elementary stream indicated by an embedded layer index in the second descriptor, when not present in the elementary stream list, shall be added to the elementary stream list, the elementary stream indicated by the embedded layer index in the second descriptor being one of the plurality of elementary streams, and
means for adding, in response to determining the first syntax element has a second value different from the first value, the elementary stream indicated by the second syntax element, when not present in the elementary stream list, into the elementary stream list, but not adding the elementary stream indicated by the embedded layer index in the second descriptor into the elementary stream list.

16. The device of claim 15, further comprising:
means for receiving a set of second descriptors in the transport stream, the set of second descriptors including the second descriptor, each respective second descriptor of the set of second descriptors being one of: a hierarchy descriptor or a hierarchy extension descriptor;
means for decoding a third syntax element in the first descriptor, the third syntax element indicating a number of elementary streams;
means for decoding a set of first syntax elements in the first descriptor; and
means for decoding a set of second syntax elements in the first descriptor, wherein:
the number of first syntax elements in the set of first syntax elements and the number of second syntax elements in the set of second syntax elements is equal to a value of the third syntax element,
the set of first syntax elements includes the first syntax element,
the set of second syntax elements includes the second syntax element,
for each respective first syntax element of the set of first syntax elements:
a respective second syntax element of the set of second syntax elements corresponds to the respective first syntax element,
a respective second descriptor of the set of second descriptors has a hierarchy layer index value equal to a value of the respective second syntax element,
the first value of the respective first syntax element specifies that:
an elementary stream indicated by the respective second syntax element, when not present in the elementary stream list, shall be added into the elementary stream list, the elementary stream indicated by the respective second syntax element being one of the plurality of elementary streams, and
an elementary stream indicated by an embedded layer index in the respective second descriptor, when not present in the elementary stream list of the operation point, shall be added to the elementary stream list, the elementary stream indicated by the embedded layer index in the respective second descriptor being one of the plurality of elementary streams, and
the device comprises means for adding, in response to determining the respective first syntax element has the second value, the respective elementary stream indicated by the respective second syntax element, when not present in the elementary stream list, into the elementary stream list, but not adding the respective elementary stream indicated by the embedded layer index in the respective second descriptor into the elementary stream list.

17. The device of claim 16, further comprising:
for each respective first syntax element of the set of first syntax elements:
a set of one or more embedded layer indices is included in the respective second descriptor, and
the device comprises means for adding, based on the respective first syntax element having the first value, in ascending order of value of the set of embedded layer indices, elementary streams indicated by the set of embedded layer indices into the elementary stream list immediately before the elementary stream indicated by the respective second syntax element.

18. The device of claim 15, further comprising:
means for decoding a set of syntax elements in the first descriptor, each respective syntax element in the set of syntax elements corresponding to a respective elementary stream in the elementary stream list, each respective syntax element of the set of syntax elements indicating whether the elementary stream corresponding to the respective syntax element of the set of syntax elements is a necessary layer,
wherein a necessary layer is defined as a layer in an output operation point associated with an output layer set, the layer being an output layer of the output layer set, or a reference layer of an output layer of the output layer set.

19. The device of claim 15, further comprising:
means for decoding a first set of syntax elements in the first descriptor, each respective syntax element in the first set of syntax elements corresponding to a respective elementary stream in the elementary stream list, each respective syntax element of the first set of syntax elements indicating whether the elementary stream corresponding to the respective syntax element of the first set of syntax elements is an output layer; and
means for decoding a second set of syntax elements in the first descriptor, each respective syntax element in the second set of syntax elements corresponding to a respective elementary stream in the elementary stream list, each respective syntax element of the second set of syntax elements indicating an index for determining a profile, tier, or level of the elementary stream corresponding to the respective syntax element of the second set of syntax elements.

20. The device of claim 15, further comprising:
means for receiving a set of second descriptors in the transport stream, the set of second descriptors including the second descriptor, each respective second descriptor of the set of second descriptors being one of: a hierarchy descriptor or a hierarchy extension descriptor; and means for decoding a set of second syntax elements in the first descriptor, wherein:
the set of second syntax elements includes the second syntax element,
each respective second syntax element of the set of second syntax elements indicating a hierarchy layer index value present in a descriptor of the set of second descriptors, and
the set of second syntax elements is restricted such that no two second syntax elements of the set of second syntax elements have the same value.

21. The device of claim 15, further comprising means for discarding data for layers that are not part of the operation point.

22. A device for processing video data, the device comprising:
one or more processors configured to:
generate a first descriptor, the first descriptor being a descriptor of an operation point of the video data;
generate a second descriptor, the second descriptor being one of: a hierarchy descriptor or a hierarchy extension descriptor;
wherein the one or more processors are configured such that, as part of generating the first descriptor, the one or more processors:
include a first syntax element and a second syntax element in the first descriptor, wherein:
an elementary stream list is a list of elementary streams that are part of the operation point,
the second descriptor has a hierarchy layer index value equal to a value of the second syntax element,
a first value of the first syntax element specifies that:
an elementary stream indicated by the second syntax element, when not present in the elementary stream list, shall be added into the elementary stream list, and
an elementary stream indicated by an embedded layer index in the second descriptor, when not present in the elementary stream list, shall be added to the elementary stream list, and
a second value of the first syntax element specifies that the elementary stream indicated by the second syntax element, when not present in the elementary stream list, shall be added into the elementary stream list, but not the elementary stream indicated by the embedded layer index in the second descriptor; and
include the first descriptor and the second descriptor in a transport stream; and
an output interface configured to output an encoded version of the video data.

23. The device of claim 22, wherein:
the one or more processors are configured to generate a set of second descriptors, the set of second descriptors including the second descriptor, each respective second descriptor of the set of second descriptors being one of: a hierarchy descriptor or a hierarchy extension descriptor;
the one or more processors are configured such that, as part of generating the first descriptor, the one or more processors:

include a third syntax element in the first descriptor, the third syntax element indicating a number of elementary streams;
include a set of first syntax elements in the first descriptor; and
include a set of second syntax elements in the first descriptor, wherein:
the number of first syntax elements in the set of first syntax elements and the number of second syntax elements in the set of second syntax elements is equal to a value of the third syntax element,
the set of first syntax elements includes the first syntax element,
the set of second syntax elements includes the second syntax element,
for each respective first syntax element of the set of first syntax elements:
a respective second syntax element of the set of second syntax elements corresponds to the respective first syntax element,
a respective second descriptor of the set of second descriptors has a hierarchy layer index value equal to a value of the respective second syntax element,
the first value of the respective first syntax element specifies that:
an elementary stream indicated by the respective second syntax element, when not present in the elementary stream list, shall be added into the elementary stream list, and
an elementary stream indicated by an embedded layer index in the respective second descriptor, when not present in the elementary stream list of the operation point, shall be added to the elementary stream list, and
the second value of the respective first syntax element specifies that the respective elementary stream indicated by the respective second syntax element, when not present in the elementary stream list, shall be added into the elementary stream list, but not the respective elementary stream indicated by the embedded layer index in the respective second descriptor.

24. The device of claim 23, wherein the one or more processors are configured such that, as part of generating the first descriptor, the one or more processors:
include a set of syntax elements in the first descriptor, each respective syntax element in the set of syntax elements corresponding to a respective elementary stream in the elementary stream list, each respective syntax element of the set of syntax elements indicating whether the elementary stream corresponding to the respective syntax element of the set of syntax elements is a necessary layer,
wherein a necessary layer is defined as a layer in an output operation point associated with an output layer set, the layer being an output layer of the output layer set, or a reference layer of an output layer of the output layer set.

25. The device of claim 22, wherein the one or more processors are configured such that, as part of generating the first descriptor, the one or more processors:
include a first set of syntax elements in the first descriptor, each respective syntax element in the first set of syntax elements corresponding to a respective elementary stream in the elementary stream list, each respective syntax element of the first set of syntax elements indicating whether the elementary stream corresponding to the respective syntax element of the first set of syntax elements is an output layer; and include a second set of syntax elements in the first descriptor, each respective syntax element in the second set of syntax elements corresponding to a respective elementary stream in the elementary stream list, each respective syntax element of the second set of syntax elements indicating an index for determining a profile, tier, or level of the elementary stream corresponding to the respective syntax element of the second set of syntax elements.

26. The device of claim 22, wherein:

the one or more processors are further configured to include a set of second descriptors in the transport stream, the set of second descriptors including the second descriptor, each respective second descriptor of the set of second descriptors being one of: a hierarchy descriptor or a hierarchy extension descriptor, and the one or more processors are configured such that, as part of generating the first descriptor, the one or more processors:

include a set of second syntax elements in the first descriptor, wherein:

the set of second syntax elements includes the second syntax element, each respective second syntax element of the set of second syntax elements indicating a hierarchy layer index value present in a descriptor of the set of second descriptors, and the set of second syntax elements is restricted such that no two second syntax elements of the set of second syntax elements have the same value.

* * * * *